(12) United States Patent
Ibrahim et al.

(10) Patent No.: US 10,880,069 B2
(45) Date of Patent: Dec. 29, 2020

(54) TECHNIQUES FOR PROCESSING MULTIPLE DIVISION DUPLEXING SCHEMES WITHIN A TRANSMISSION TIME INTERVAL

(71) Applicant: Huawei Technologies Duesseldorf GmbH, Duesseldorf (DE)

(72) Inventors: Mohamed Ibrahim, Munich (DE); Wen Xu, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/434,912

(22) Filed: Jun. 7, 2019

(65) Prior Publication Data
US 2019/0288828 A1 Sep. 19, 2019

Related U.S. Application Data

(63) Continuation of application No. PCT/EP2016/080306, filed on Dec. 8, 2016.

(51) Int. Cl.
*H04L 5/14* (2006.01)
*H04L 5/00* (2006.01)
*H04L 27/26* (2006.01)
*H04W 72/04* (2009.01)

(52) U.S. Cl.
CPC ......... *H04L 5/1469* (2013.01); *H04L 5/0053* (2013.01); *H04L 5/0082* (2013.01); *H04L 5/14* (2013.01); *H04L 27/2607* (2013.01); *H04W 72/0446* (2013.01); *H04W 72/0453* (2013.01)

(58) Field of Classification Search
CPC ....... H04L 5/0053; H04L 5/0082; H04L 5/14; H04L 27/2607; H04W 72/0446
See application file for complete search history.

(56) References Cited

U.S. PATENT DOCUMENTS

2006/0013151 A1* 1/2006 Lee ................. H04B 7/0619
370/280
2009/0122731 A1* 5/2009 Montojo ............ H04L 27/2647
370/280

(Continued)

FOREIGN PATENT DOCUMENTS

WO   2016122845 A1   8/2016

OTHER PUBLICATIONS

Fujitsu, "Discussion on flexible/dynamic TDD", 3GPP TSG RAN WG1 Meeting #86bis, Lisbon, Portugal, R1-1608805, pp. 1-5, 3rd Generation Partnership Project, Valbonne, France (Oct. 10-14, 2016).

*Primary Examiner* — Jael M Ulysse
(74) *Attorney, Agent, or Firm* — Leydig, Voit & Mayer, Ltd.

(57) ABSTRACT

The disclosure relates to a radio transceiver device, comprising: a processor, configured to process a radio subframe comprising a plurality of resource elements in time and frequency, wherein a first portion of the resource elements comprises resource elements which are based on a first division duplexing scheme, and wherein a second portion of the resource elements comprises resource elements which are based on a second division duplexing scheme; and a transceiver configured to transceive the radio subframe within a transmission time interval (TTI).

17 Claims, 16 Drawing Sheets

(56) References Cited

U.S. PATENT DOCUMENTS

| | | | |
|---|---|---|---|
| 2015/0016310 A1* | 1/2015 | Yi | H04L 5/0053 370/277 |
| 2015/0030090 A1* | 1/2015 | You | H04L 5/16 375/260 |
| 2015/0124663 A1* | 5/2015 | Chen | H04L 5/0073 370/278 |
| 2015/0230268 A1* | 8/2015 | Chen | H04L 5/0053 370/280 |
| 2016/0020891 A1* | 1/2016 | Jung | H04W 72/0446 370/280 |
| 2016/0044706 A1* | 2/2016 | Yang | H04W 72/1268 370/329 |
| 2016/0119948 A1* | 4/2016 | Damnjanovic | H04W 72/14 370/280 |
| 2016/0164622 A1* | 6/2016 | Yi | H04L 5/14 370/280 |
| 2016/0249329 A1* | 8/2016 | Au | H05K 999/99 |
| 2016/0261296 A1* | 9/2016 | Ouchi | H04L 5/14 |
| 2016/0353475 A1* | 12/2016 | Au | H04L 5/0042 |
| 2016/0360550 A1* | 12/2016 | Chen | H04L 5/1469 |
| 2017/0366311 A1* | 12/2017 | Iyer | H04L 5/0007 |

\* cited by examiner

TECHNIQUES FOR PROCESSING MULTIPLE DIVISION DUPLEXING SCHEMES WITHIN A TRANSMISSION TIME INTERVAL

CROSS REFERENCE TO RELATED APPLICATIONS

This application is a continuation of International Application No. PCT/EP2016/080306, filed on Dec. 8, 2016, the disclosure of which is hereby incorporated by reference in its entirety.

TECHNICAL FIELD

Embodiments of the present disclosure relate to techniques for processing multiple division duplexing schemes such as different kinds of Time Division Duplexing (TDD) and different kinds of Frequency Division Duplexing (TDD) within a Transmission Time Interval (TTI). In particular, embodiments of the present disclosure relate to hybrid FDD/TDD duplexing for ultra-low latency communications.

BACKGROUND

In mobile communications, in particular in device-to-device (D2D) communication scenarios, for example communication between cars or between user equipment (UE) and cars or other mobile devices, downlink (DL) versus uplink (UL) traffic is known to be symmetric and bursty. In these scenarios the problem is to provide fair time and frequency resources to UL and DL which corresponds to the actual DL/UL traffic. Current applications are based on TDD and FDD within LTE (Long Term Evolution) communications or planned for 5G communications. In FDD a limited number of bandwidths, i.e. 1.25 MHz, 2.5 MHz, 5 MHz, 10 MHz and 20 MHz are available. Flexibly varying the bandwidth of DL/UL is different due to resource limitations, i.e. frequency allocation dependence. The only five available bandwidths mentioned above result in course resource allocation. In TDD there are seven TDD configurations times nine subframe configurations resulting in 63 resource configurations. Varying the number of subframes allocated for DL and UL is not practical for low latency applications. This would result in a large waste of whole symbol guard periods.

SUMMARY

It is the object of the invention to provide a concept for providing fair time-frequency resources allocation between DL and UL according to their actual traffic, in particular under low latency constraints.

This object is achieved by the features of the independent claims. Further implementation forms are apparent from the dependent claims, the description and the figures.

A basic idea of the invention is to tune time and frequency duplexing within a single subframe in order to match the available resources to the actual DL:UL traffic. DL and UL traffic is multiplexed in time and frequency simultaneously within the same subframe. The guard periods are tuned to maintain time synchronism and the receiver performs compensation to maintain frequency orthogonality.

The transmission and reception devices described herein may be implemented in wireless communication networks, in particular communication networks based on mobile communication standards such as LTE, in particular LTE-A and/or OFDM. The transmission and reception devices described herein may further be implemented in a mobile device (or mobile station or User Equipment (UE)), in particular for the scenario of device-to-device (D2D) communication where one mobile device communicates with another mobile device. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

D2D communications in cellular networks is defined as direct communication between two mobile devices or mobile users without traversing the Base Station (BS) or eNodeB or the core network. D2D communications is generally non-transparent to the cellular network and can occur on the cellular spectrum (i.e., inband) or unlicensed spectrum (i.e., outband). D2D communications can highly increase spectral efficiency, improve throughput, energy efficiency, delay, and fairness of the network. The transmission and reception devices described herein may be implemented in mobile devices communicating under D2D scenarios. However, the transmission and reception devices described herein may also be implemented in a base station (BS) or eNodeB.

The transmission and reception devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The transmission and reception devices described herein may be designed in accordance to mobile communication standards such as e.g. the Long Term Evolution (LTE) standard or the advanced version LTE-A thereof. LTE marketed as 4G and 5G LTE and beyond, is a standard for wireless communication of high-speed data for mobile phones and data terminals.

The transmission and reception devices described herein may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The transmission and reception devices described herein may be applied in 5GETLA communication schemes. 5GETLA is a TDD variant which tries to balance the resources by modifying the switching time between UL and DL according to "T. Levanen, J. Pirskanen, T. Koskela, J. Talvitie, and M. Valkama. Low latency radio interface for 5g flexible tdd local area communications. In 2014 IEEE International Conference on Communications Workshops (ICC), pages 7-13, June 2014". The approach can be regarded as an extension of LTE TDD but with finer time resolution in resource allocation. So far, this approach has been mainly designated for mmWave due to extremely short symbols resulting in finer time resolution.

The transmission and reception devices described herein may be applied in low latency communication schemes. Low latency is achieved by having shorter transmission time intervals (TTIs). Using shorter symbols imply larger CP overhead, hence one can resort to having fewer number of symbols per TTI. Fewer symbols per TTI imply coarser time resolution. As the available resources get scarce, the transmitter increases the modulation order and coding rate to fit into the latency deadline of the transport block. This leads to a natural loss in performance. The transmission and reception devices described herein provide a solution for that performance loss.

In order to describe the embodiments of the invention in detail, the following terms, abbreviations and notations will be used:

FDD: Frequency Division Duplex
TDD: Time Division Duplex
D2D: Device-to-device
OFDM: Orthogonal Frequency Division Multiplex
DL: Downlink
UL: Uplink
BS: Base Station, eNodeB, eNB
UE: User Equipment, e.g. a mobile device or a machine type communication device
4G: $4^{th}$ generation according to 3GPP standardization
5G: $5^{th}$ generation according to 3GPP standardization
LTE: Long Term Evolution
RF: Radio Frequency
SNR: Signal to Noise Ratio
GP: Guard Period
MBB: Mobile BroadBand
URLLC: Ultra-Reliable Low Latency Communications
FFT: Fast Fourier Transform
ACK: Acknowledgement
TTI: Transmission Time Interval
V2V: Vehicle to Vehicle
CAM: Cooperative Awareness Message
TX: Transmit
RX: Receive
BPF: Band Pass Filter According to a first aspect, the embodiments of the invention relate to a radio transceiver device, comprising: a processor, configured to process a radio subframe comprising a plurality of resource elements in time and frequency, wherein a first portion of the resource elements comprises resource elements which are based on a first division duplexing scheme, and wherein a second portion of the resource elements comprises resource elements which are based on a second division duplexing scheme; and a transceiver configured to transceive the radio subframe within a transmission time interval (TTI).

The first and second portions can be time or frequency or both. The first and second division duplexing schemes can be TDD or FDD or any other duplexing scheme.

Such a radio transceiver device can provide fair time-frequency resources allocation between DL and UL according to their actual traffic, in particular under low latency constraints. This fairer resource distribution is specially obtained in short TTI situations and results in less performance degradation due to MCS modification. The radio transceiver device further provides a more efficient use of resources since FDD bands can be placed close to each other. Such a radio transceiver device can multiplex low latency traffic and latency tolerant traffic in the same frame. Hence, less guard period and guard band overhead can be achieved due to tailored overhead in TDD domain.

In a first possible implementation form of the radio transceiver device according to the first aspect the first division duplexing scheme is a first time division duplexing (TDD) scheme and the second division duplexing scheme is a second TDD scheme having a different time switching point than the first TDD scheme.

Such a radio transceiver device has the advantage of providing flexibility between using TDD schemes and/or FDD schemes.

In a second possible implementation form of the radio transceiver device according to the first implementation form of the first aspect, a difference between the time switching point of the first TDD scheme and the time switching point of the second TDD scheme corresponds a time duration of one symbol.

This provides the advantage that a high resolution can be obtained by using such a frame structure.

In a third possible implementation form of the radio transceiver device according to any one of the first to the second implementation forms of the first aspect, resource elements of the radio subframe ranging from the time switching point of the first TDD scheme to the time switching point of the second TDD scheme comprise a first frequency section carrying UL symbols and a second frequency section carrying DL symbols.

This provides the advantage that the relation of UL symbols versus DL symbols can be fine-tuned.

In a fourth possible implementation form of the radio transceiver device according to the third implementation form of the first aspect, a frequency switching point between the first frequency section and the second frequency section is variable.

This provides the advantage that the frame is suitable for low-latency bidirectional traffic for which the ratio between UL symbols and DL symbols can be fine-tuned.

In a fifth possible implementation form of the radio transceiver device according to any one of the third to the fourth implementation forms of the first aspect, the UL symbols of the first frequency section and the DL symbols of the second frequency section have a guard period of zero or more subcarriers in between.

This provides the advantage that a guard period can be used to mitigate self-interference.

In a sixth possible implementation form of the radio transceiver device according to any one of the third to the fifth implementation forms of the first aspect, the UL symbols of the first frequency section and the DL symbols of the second frequency section are precoded.

This provides the advantage that the precoded UL and DL symbols can provide a better mitigation of self-interference.

In a seventh possible implementation form of the radio transceiver device according to any one of the fourth to the sixth implementation forms of the first aspect, the processor is configured to determine the frequency switching point between the first frequency section and the second frequency section and/or the time switching points of the first TDD scheme and the second TDD scheme according to an optimization criterion, in particular a desired DL versus UL data rate ratio.

This provides the advantage that the DL versus UL ratio can be optimally adjusted.

In an eighth possible implementation form of the radio transceiver device according to the first aspect as such or according to any of the preceding implementation forms of the first aspect, the radio subframe comprises a section of UL symbols and a section of DL symbols which are separated by a guard period.

This provides the advantage that the guard period can be provide synchronization of the radio subframe between transmitter and receiver and vice versa.

In a ninth possible implementation form of the radio transceiver device according to the eighth implementation form of the first aspect, the guard period corresponds to a difference between the time switching point of the first TDD scheme and the time switching point of the second TDD scheme when the radio transceiver device switches from reception to transmission; and the guard period corresponds to the difference between the time switching point of the first TDD scheme and the time switching point of the second TDD scheme which difference is increased by twice a propagation time when the radio transceiver device switches from transmission to reception.

This provides the advantage that the different channel conditions at transmitter and receiver can be considered to minimize the GP to the minimum physical needed time.

In a tenth possible implementation form of the radio transceiver device according to any one of the eighth to the ninth implementation forms of the first aspect, the processor is configured to add a redundant guard period at transmission and/or reception to maintain subframe alignment.

This provides the advantage that this redundant guard period can be used to align the subframes at receiver and/or transmitter.

In an eleventh possible implementation form of the radio transceiver device according to the first aspect as such or according to any of the preceding implementation forms of the first aspect, the processor is configured to process a next radio subframe, wherein a location of UL subcarriers and DL subcarriers alternate from the radio subframe to the next radio subframe.

The benefit of switching locations is to obtain full channel knowledge at the whole bandwidth due to channel reciprocity.

In a twelfth possible implementation form of the radio transceiver device according to the first aspect as such or according to any of the preceding implementation forms of the first aspect, the transceiver comprises a transmitter configured to transmit a transmit signal based on the radio subframe within a transmission time interval, wherein the transceiver comprises a receiver configured to receive a receive signal within a reception time interval that is delayed with respect to the transmission time interval, in particular delayed by a propagation time, wherein the processor is configured to append a first portion of the transmit signal that is located outside of the reception time interval as a second portion of the transmit signal that is located inside the reception time interval in order to align the transmission time interval with the reception time interval.

Such a radio transceiver device can perform time-domain compensation by a simple delay circuit coupled in parallel to transmitter and receiver.

In a thirteenth possible implementation form of the radio transceiver device according to the twelfth implementation form of the first aspect, the transmitter is configured to transmit the transmit signal without the appended second portion of the transmit signal.

This provides the advantage that at the second portion of the transmit signal a GP can be included instead of the transmit signal to maintain subframe alignment.

In a fourteenth possible implementation form of the radio transceiver device according to any one of the twelfth to the thirteenth implementation forms of the first aspect, the processor is configured to compensate the first portion of the transmit signal in time-domain or in frequency domain.

In time domain, the first portion can be appended as described below with respect to FIGS. 9 and 10. In frequency domain, the first portion is not simply appended, but rather an FFT is computed and the resultant is added to the frequency domain so that in the end it will have the same effect as appending in time.

In a fifteenth possible implementation form of the radio transceiver device according to the first aspect as such or according to any of the preceding implementation forms of the first aspect, the first division duplexing scheme is a first frequency division duplexing (FDD) scheme and the second division duplexing scheme is a second FDD scheme having a different frequency switching point than the first FDD scheme.

This provides high flexibility in designing the radio subframe.

In a sixteenth possible implementation form of the radio transceiver device according to the first aspect as such or according to any of the preceding implementation forms of the first aspect, the first portion of the resource elements carry downlink (DL) symbols and the second portion of the resource elements carry uplink (UL) symbols. Portion may refer to both time and/or frequency.

This provides the advantage that the subframe can be flexibly designed including DL and/or UL symbols.

In a seventeenth possible implementation form of the radio transceiver device according to the first aspect as such or according to any of the preceding implementation forms of the first aspect, the first portion of the resource elements comprises a first part carrying a first type of data traffic, in particular mobile broadband (MBB), and a second part carrying a second type of data traffic, in particular ultra-reliable low latency communications (URLLC).

This provides the advantage that two different types of data can be transported within a single subframe within a single TTI.

In an eighteenth possible implementation form of the radio transceiver device according to the first aspect as such or according to any of the preceding implementation forms of the first aspect, the first portion of the resource elements and the second portion of the resource elements carry a same type of data traffic, in particular MBB or URLLC.

This provides high flexibility since either different types or the same type of data traffic can be transported within a single subframe within a single TTI.

According to a second aspect, the embodiments of the invention relate to a method for transceiving a radio subframe, the method comprising: processing a radio subframe comprising a plurality of resource elements in time and frequency, wherein a first portion of the resource elements comprises resource elements which are based on a first division duplexing scheme, and wherein a second portion of the resource elements comprises resource elements which are based on a second division duplexing scheme; and transceiving transceiver the radio subframe within a transmission time interval (TTI).

Such a method can provide fair time-frequency resources allocation between DL and UL according to their actual traffic, in particular under low latency constraints. This fairer resource distribution is specially obtained in short TTI situations and results in less performance degradation due to MCS modification. This method further provides a more efficient use of resources since FDD bands can be placed close to each other. Such a method can multiplex low latency traffic and latency tolerant traffic in the same frame. Hence, less guard period and guard band overhead can be achieved due to tailored overhead in TDD domain.

According to a third aspect, the embodiments of the invention relate to a communication system comprising two entities using multicarrier communications, where the latency-sensitive uplink and downlink streams share the same carrier frequency and have TDD multiplexing with different switching points on different group of subcarriers.

In a first possible implementation form of the communication system according to the third aspect, for multicarrier symbols where both UL and DL streams exist, a precoding mean is applied to reduce the interference between UL and DL, such precoding means is later switched off for multi-carrier symbols with UL only or DL only.

In a second possible implementation form of the communication system according to the third aspect as such or according to the first implementation form of the third aspect, the ratio of resources allocated for DL to UL is determined by a parameter which reflects the data rate required by DL compared to the data rate of UL.

In a third possible implementation form of the communication system according to the third aspect, the guard period inserted between transmission and reception is limited to the sum of the two way propagation delay and hardware switching speed, and the guard period inserted between reception and transmission is limited to the processing delay only.

In a fourth possible implementation form of the communication system according to the third aspect as such or according to the third implementation form of the third aspect, a guard period is inserted between two transmission intervals in order to guarantee that the subframes are synchronized in time at the transmitter and receiver.

In a fifth possible implementation form of the communication system according to the third aspect, the receiver appends a portion of the transmitted signal into the end of the transmit signal to maintain orthogonality of the Fast Fourier Transform.

In a sixth possible implementation form of the communication system according to the third aspect as such or according to the fifth implementation form of the third aspect, the appended portion is not transmitted but directly inserted into the receiver's FFT module.

In a seventh possible implementation form of the communication system according to the third aspect as such or according to any of the fifth to the sixth implementation forms of the third aspect, the length of the duration of the appended portion is equal to the estimated propagation delay of the electromagnetic wave between the communicating entities.

BRIEF DESCRIPTION OF DRAWINGS

Further embodiments of the invention will be described with respect to the following figures, in which.

DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
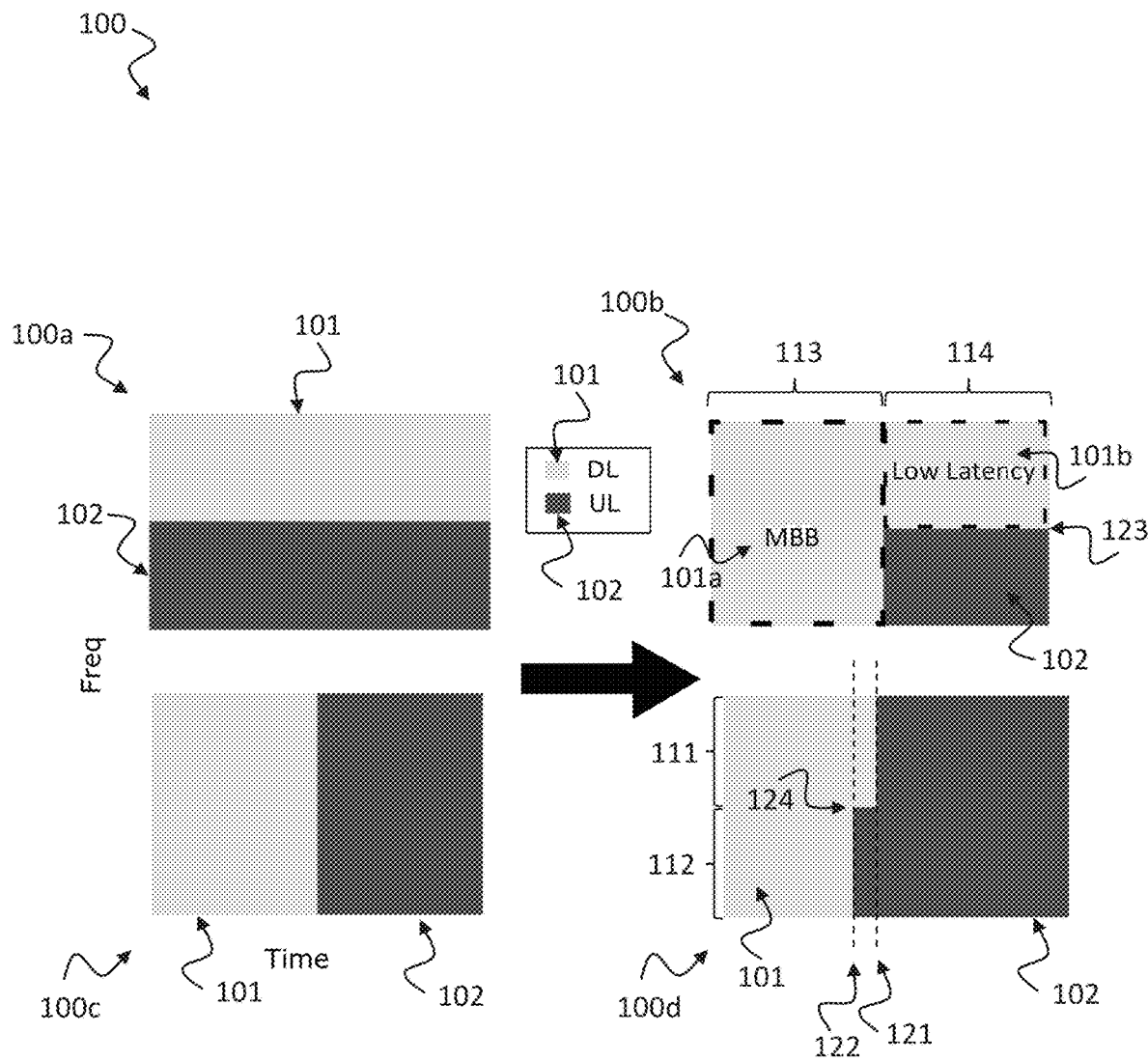
FIG. 1 shows four frequency-time diagrams 100 illustrating the new frame structure according to this disclosure for Variant A 100b and Variant B 100d compared to the common FDD 100a and TDD 100c frame structures.

FIG. 1 shows four frequency-time diagrams 100 illustrating the new frame structure according to this disclosure for Variant A 100b and Variant B 100d compared to the common FDD 100a and TDD 100c frame structures. In all four graphs 100a, 100b, 100c, 100d, a single subframe is depicted (in time direction).

The top left graph 100a shows the common FDD frame structure in which a first section of frequency resources is assigned to DL traffic 101 while a second section of frequency resources is assigned to UL traffic 102. The bottom left graph 100c shows the common TDD frame structure in which a first section of time resources is assigned to DL traffic 101 while a second section of time resources is assigned to UL traffic 102.

The idea of this disclosure is to utilize both time and frequency dimensions in balancing the resources between UL 102 and DL 101. By doing so, one obtains two degrees of freedom for resource allocation; time and frequency. Effectively, the frame becomes a mixture of FDD and TDD as shown by both right graphs 100b and 100d. MBB 101a and low latency traffic 101b may coexist within the same frame. Time and frequency duplexing is tuned within a single subframe in order to match the available resources to the actual DL:UL traffic. The right-hand side graphs of FIG. 1 show the two variants of the disclosed frame structure: Variant A 100b (top right), where the communicating entities have different type of traffic (e.g. Mobile BroadBand (MBB) 101a and Ultra-Reliable Low Latency Communications (URLLC) 101b); Variant B 100d (bottom right), where the traffic is of the same type but of frequently variable DL:UL traffic.

In frame type variant A 100b, one subframe includes a first (time) section 113 in which a first FDD scheme is applied and a second (time) section 114 in which a second FDD scheme is applied. In this exemplary frame structure 100b, the first FDD scheme assigns the whole frequency resources to DL traffic 101, in particular to MBB traffic 101a; and the second FDD scheme assigns a first part of the frequency resources to DL traffic 101, in particular Low Latency traffic 101b and a second part of the frequency resources to UL traffic 102. A frequency switching point between the first part and the second part of the frequency resources duplexed by the second FDD scheme is denoted as 123.

In frame type variant B 100d, one subframe includes a first (frequency) section 111 in which a first TDD scheme is applied and a second (frequency) section 112 in which a second TDD scheme is applied. In this exemplary frame structure 100d, the first TDD scheme assigns first time resources from start of the subframe until a first time switching point 121 to DL traffic 101 and assigns second time resources starting with the first time switching point 121 until the end of the subframe to UL traffic 102. The second TDD scheme assigns first time resources from start of the subframe until a second time switching point 122 to DL traffic 101 and assigns second time resources starting with the second time switching point 122 until the end of the subframe to UL traffic 102. A difference between second time switching point 122 and first time switching point 121 (or vice versa) corresponds to the duration of a single symbol.

Figure 2:
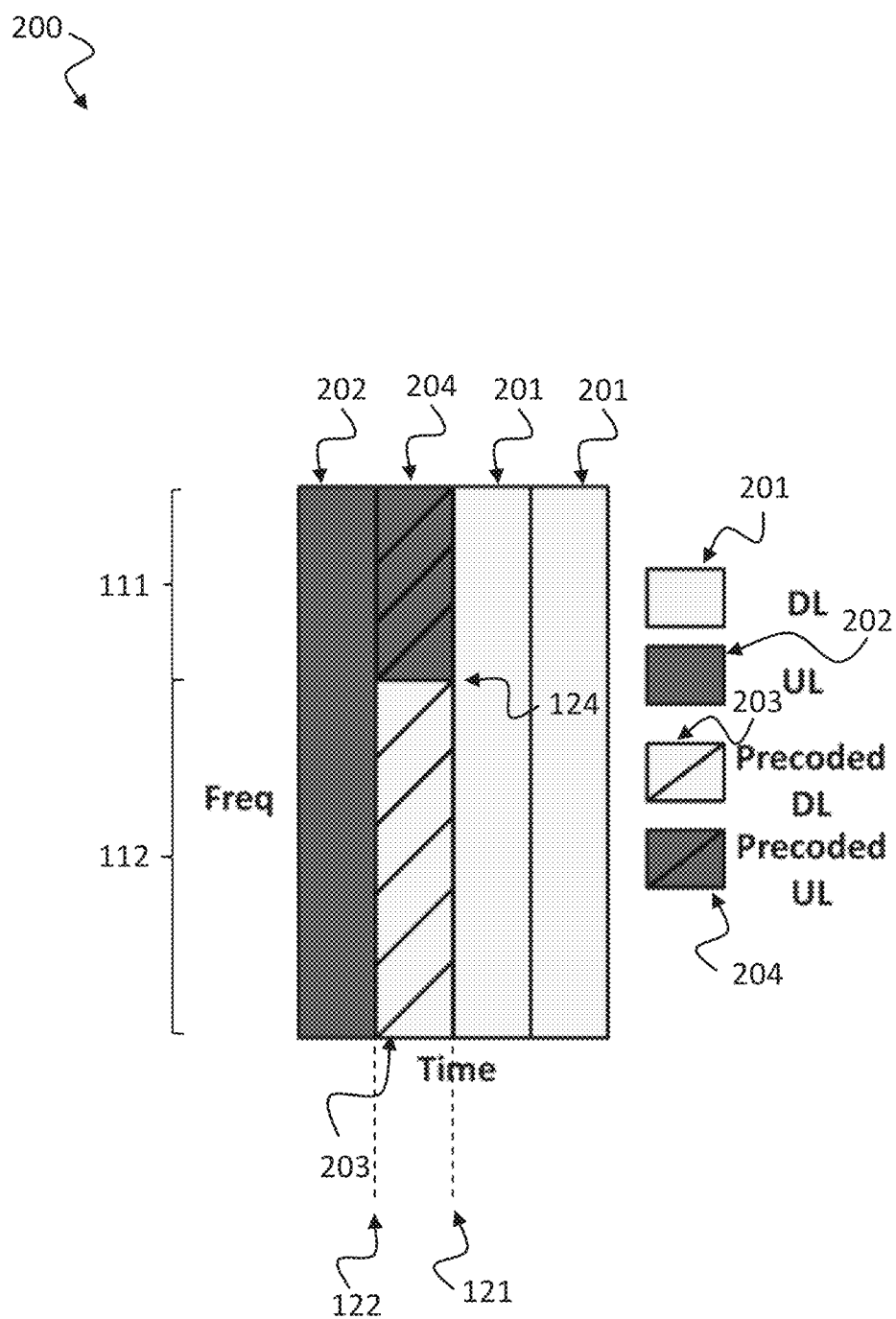
FIG. 2 shows a frequency-time diagram illustrating precoded symbols in the disclosed frame structure 200 to minimize interference according to an implementation form.

FIG. 2 shows a frequency-time diagram illustrating precoded symbols in the disclosed frame structure 200 to minimize interference according to an implementation form. This frequency-time diagram corresponds to a section of the frame type variant B 100d described above with respect to FIG. 1 in which UL traffic 102 and DL traffic 101 are flipped. The frame structure 200 includes a first part of frequency resources including UL traffic 202, a second part of frequency resources including both, precoded UL traffic 204 and precoded DL traffic 203 and a third part of frequency resource including DL traffic 201. The second part of frequency resources including both, the precoded UL traffic 204 and the precoded DL traffic 203 is arranged between the second time switching point 122 and the first time switching point 121 as shown in FIG. 1. The precoded UL traffic 204 and the precoded DL traffic 203 of the second part of frequency resources are separated by the frequency switching point 124 as shown in FIG. 1.

Note that DL 201 and UL transmissions 202 occurring at the same time but different subcarriers may have zero guard band in between. The DL-UL interference is mitigated using a precoding approach. Different service types may coexist within the same subframe. For example, in FIG. 1, the MBB 101a may occupy the whole bandwidth at the first portion 113 of the subframe 100b. While at the second portion 114 of the subframe 100b, low latency traffic 101b may be transmitted, where the acknowledgement from the receiver arrives a few OFDM symbols later but still within the same subframe 100b.

FIG. 2 show the concept according to the disclosure, i.e. tuning resources on the symbol and subcarrier level instead of subframe and PRB (physical resource block) level in order to allow for two dimensional flexible resource allocation under low latency constraints. This means in a single subframe, both DL and UL are multiplexed in both time and frequency. Allowing DL and UL to exist on adjacent subcarriers is achievable by using a precoder during the symbols when both DL and UL traffic exist. During other symbols the precoder is switched off as shown in FIG. 2. This is more efficient and backwards compatible than other complex approaches where a filtered waveform is constantly used to suppress out of band emissions.

Hence, latency constraints of <250 µs for both UL and DL which is required in some mission critical services (V2V) can be addressed by using the disclosed frame structure. Since for low latency applications, a subframe is quite long, using symbol-wise resource tuning according to the disclosure improves flexibility and reduces delay. Extending the multiplexing from subframe to symbol is not straightforward due to the simultaneous subcarrier tuning, which imposes restrictions on the guard periods. In the disclosed approach a single carrier band may be used where all the DL and UL occur within the same carrier and very narrow to zero guard band. Allowing both DL 203 and UL 204 to exist on neighbouring subcarriers is achieved using precoding to limit the interference.

Flexible duplex configures subframes (time dimension) to DL or UL depending on the traffic. In order to tune the frequency domain, the bandwidth of DL or UL should be tuned, which is difficult in practice. In disclosed frame structure both time and frequency are utilized to fine tune the resources in each traffic direction, which offers an extra degree of freedom, which is not available in flexible duplex. In practical situations, the available bandwidth is fixed hence the frequency degree of freedom can achieve finer resource allocations compared to tuning the time (subframes in flexible duplex). This disclosed new frame structure is targeted, inter alia, for 5G mission critical services with high computational power UEs (vehicles).

Figure 3:
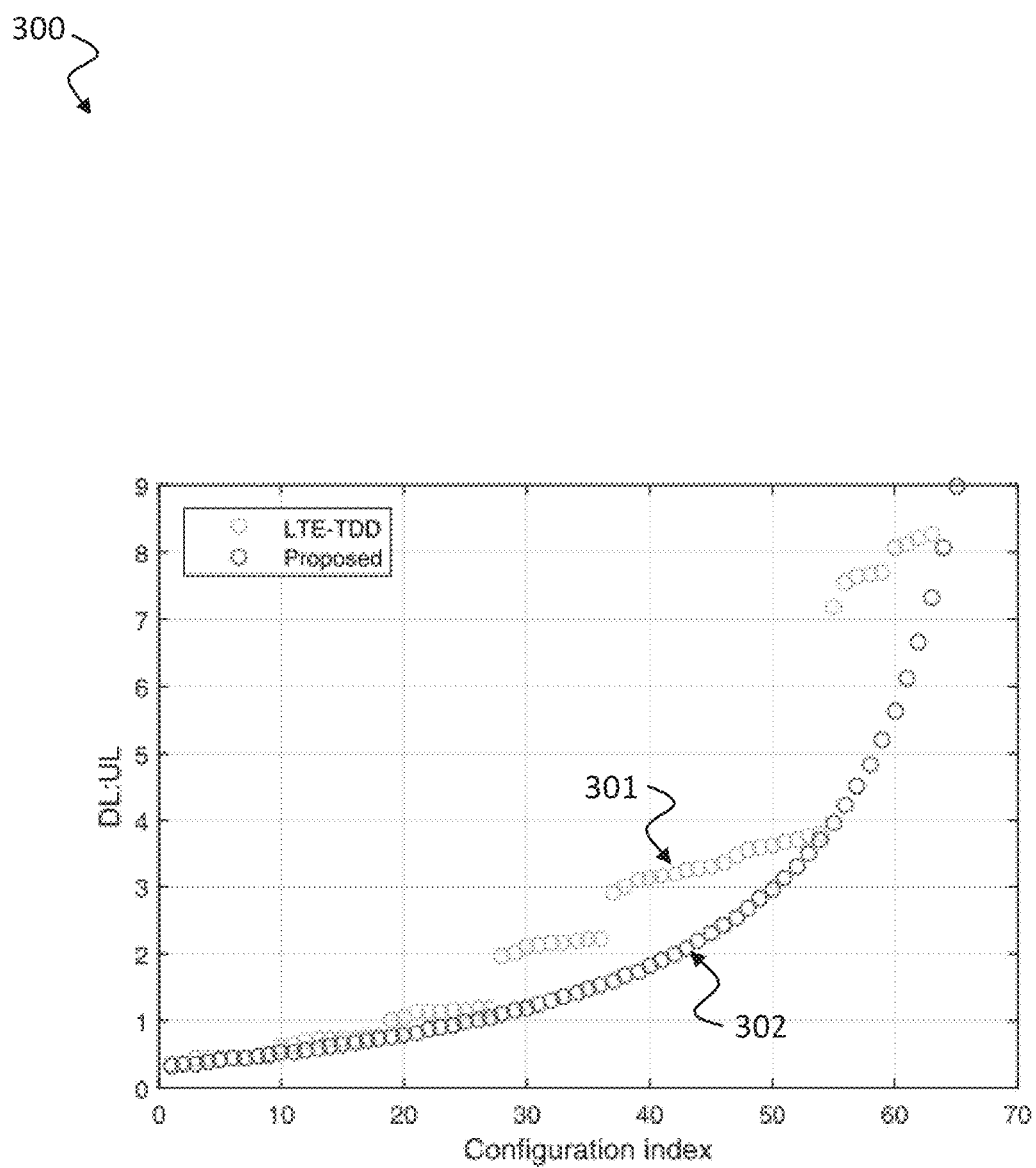
FIG. 3 shows a configuration diagram 300 illustrating achievable UL:DL for all possible LTE TDD configurations for the disclosed frame structure compared to the common LTE TDD frame structure.

FIG. 3 shows a configuration diagram 300 illustrating achievable UL:DL for all possible LTE TDD configurations for the disclosed frame structure compared to the common LTE TDD frame structure. FIG. 3 shows the improvement of the disclosed frame structure 302 compared to LTE-TDD 301 in terms of the range of supported DL:UL traffic ratios. As shown, the gaps which were present in LTE-TDD 301 are filled in the disclosed frame structure 302. Hence, the disclosed frame structure 302 achieves a higher resolution in UL:DL configurations.

Figure 4:
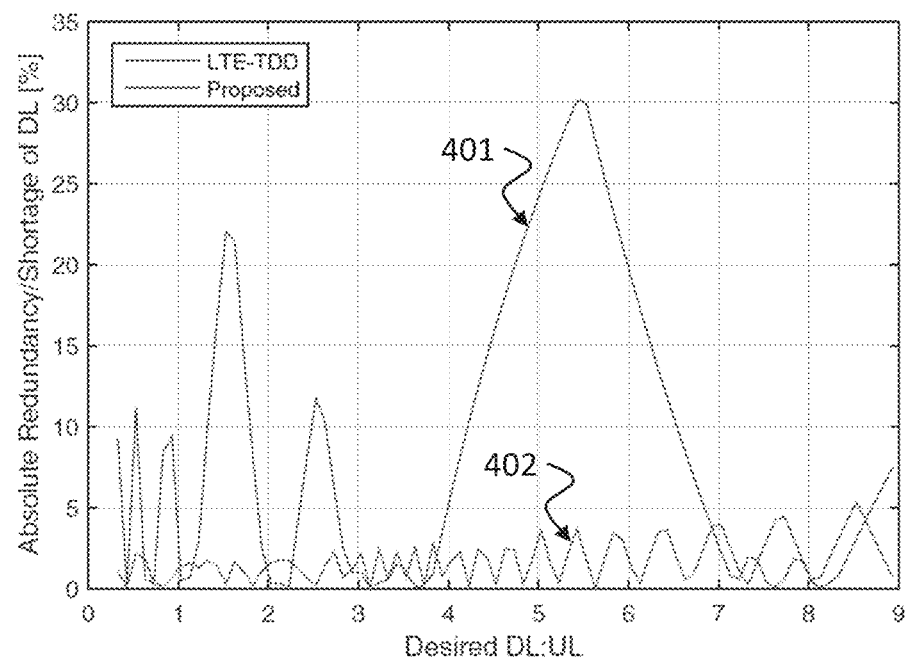
FIG. 4 shows a redundancy diagram 400 illustrating redundancy for different values of DL:UL for the disclosed frame structure compared to the common LTE TDD frame structure.

FIG. 4 shows a redundancy diagram 400 illustrating redundancy for different values of DL:UL for the disclosed frame structure 402 compared to the common LTE TDD frame structure 401. The redundancy of resources allocated for DL or UL for different configuration indices which is defined as:

$$\text{redundancy} = \frac{|(\text{Attainable } R_{DL:UL}) - (\text{Desireable } R_{DL:UL})|}{(\text{Desireable } R_{DL:UL})}$$

is much lower for the disclosed frame structure 402 than for the common LTE TDD frame structure 401. Thus using the disclosed frame structure 402 is more efficient than using the common LTE TDD frame structure 401.

Figure 5:
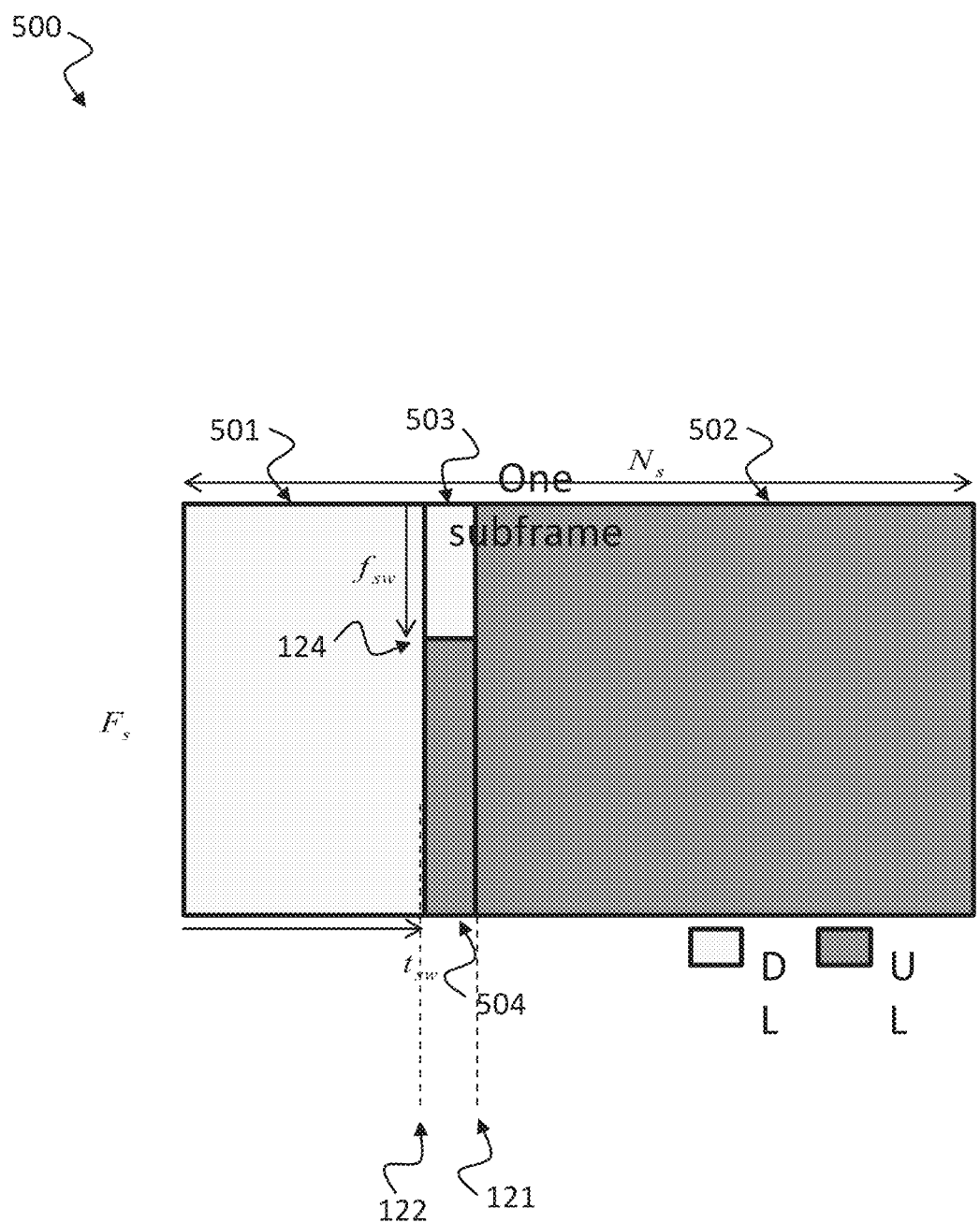
FIG. 5 shows a frequency-time diagram illustrating location of switching points for the disclosed frame structure 500 according to an implementation form.

FIG. 5 shows a frequency-time diagram illustrating location of switching points for the disclosed frame structure 500 according to an implementation form. The frame structure 500 illustrates one subframe in time and a number of Fs subcarriers in frequency.

This frequency-time diagram corresponds to a section of the frame type variant B 100d described above with respect to FIG. 1. The frame structure 500 includes a first part of frequency resources including DL traffic 501, a second part of frequency resources including both, (precoded) DL traffic 503 and (precoded) UL traffic 504 and a third part of frequency resource including UL traffic 502. The second part of frequency resources including both, the (precoded) DL traffic 503 and the precoded UL traffic 504 is arranged between the second time switching point 122 and the first time switching point 121 as shown in FIG. 1. The (precoded) DL traffic 503 and the (precoded) UL traffic 504 of the second part of frequency resources are separated by the frequency switching point 124 as shown in FIG. 1.

For a given subframe numerology with $N_s$ symbols and $F_s$ subcarriers per subframe, the switching point in time $t_{sw}$ and frequency $f_{sw}$, are defined and signaled as shown in FIG. 5. According to the notation of FIG. 1 the switching point in time $t_{sw}$ corresponds to the second time switching point 122.

The total number of available resource elements in the time-frequency grid is $N_s$ times $F_s$. We denote DL:UL traffic as $r_{dl}$ which is defined as $D_{DL}/(D_{DL}+D_{UL})$, where $D_{DL}$ and $D_{UL}$ are the required data rates of the MAC layer of DL and UL, respectively. We consider MAC layer data rate rather than PHY layer to avoid adapting to the fast adaptation of MCS (modulation and coding scheme).

$t_{sw}$ may be calculated as floor($r_{dl} \times N_s$), where floor defines the lower closest integer. $f_{sw}$ may be defined as round($r_{dl} \times N_s \times F_s - F_s \times t_{sw}$). To signal those parameters, a master-slave role definition of the communicating entities may be defined at the beginning of a communication session. In classical cellular communications, the base station may always play the role of the master and the UE play the role of the slave. In D2D, the role assignment may be performed at session initiation.

In one implementation, the slave may periodically signal its desired data rate $D_{UL}$, in the control channel. The master may compute $r_{dl}$ from the received $D_{UL}$, and its own $D_{DL}$. Then the switching points $t_{sw}$ and $f_{sw}$ may be signaled to the slave. This implies that the master always transmits at the first portion of the subframe where the control channel is sent at the beginning of the subframe.

In case a guard band is available between the DL and UL transmissions occurring at the same time, the number of guard subcarriers may be signaled as well.

Figure 6:
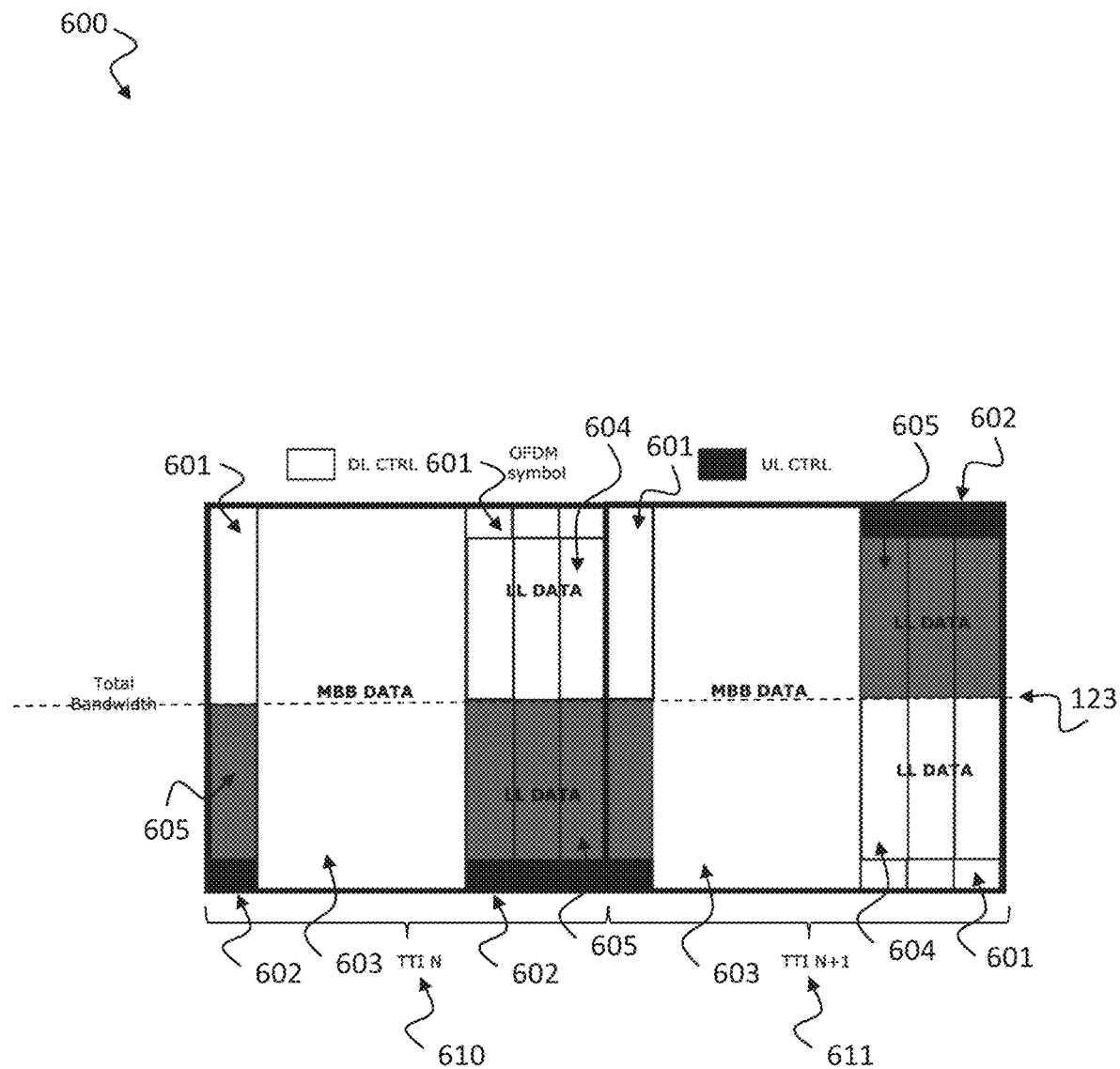
FIG. 6 shows a frequency-time diagram illustrating two subframes 600 with flipped DL and UL locations to obtain full channel reciprocity according to an implementation form.

FIG. 6 shows a frequency-time diagram illustrating two subframes 600 with flipped DL and UL locations to obtain full channel reciprocity according to an implementation form. A first subframe 610 corresponding to transmission time interval (TTI) N may correspond to the frame structure 100b as described above with respect to FIG. 1. This first subframe 610 includes a section of DL control 601, a section of LL UL data 605, a section of LL DL data 604, a section of UL control 602 and a section of MBB DL data 603. A second subframe 611 corresponding to transmission time interval (TTI) N+1 may correspond to the frame structure 100b as described above with respect to FIG. 1 in which DL sections 101 and UL sections 102 are flipped. This second subframe 611 includes a section of DL control 601, a section of LL UL data 605, a section of LL DL data 604, a section of UL control 602 and a section of MBB DL data 603. The DL sections 601, 604, 603 and UL sections 605, 602 are flipped with respect to the frequency switching point 123 of the second FDD scheme as described above with respect to FIG. 1.

The location of the DL and UL alternate from one subframe 610 to the next 611 as shown in FIG. 6. This feature allows obtaining full channel knowledge at the whole bandwidth instead of just at the portion of subcarriers with UL transmission. By switching the location of UL and DL low latency traffic, full channel reciprocity can be gained over the whole bandwidth. Channel knowledge at the transmitter side can be used for: MIMO BF/Precoding, Channel preequalization.

Figure 7:
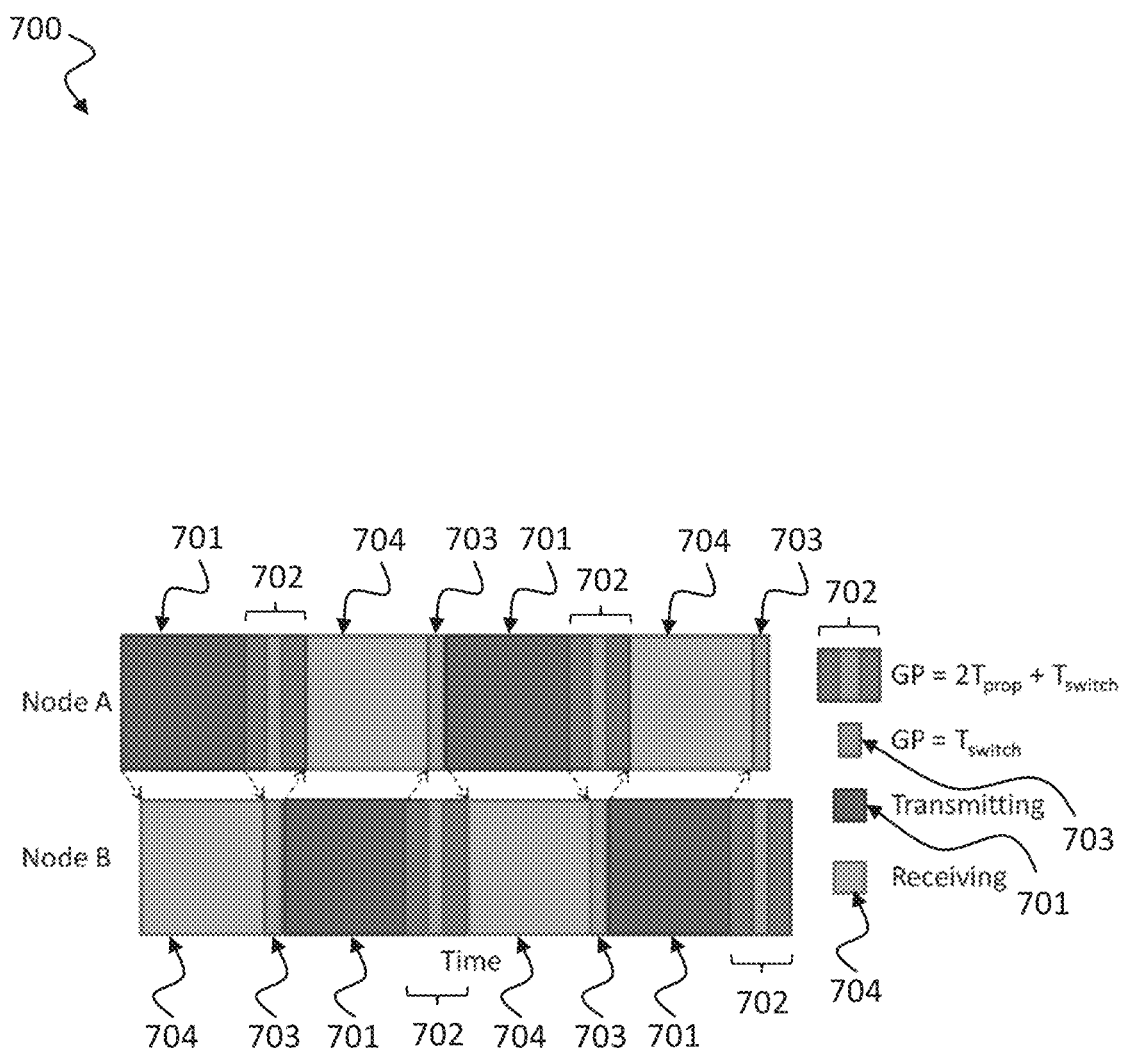
FIG. 7 shows a frequency-time diagram 700 illustrating two nodes of a TDD system with minimum guard period (GP) needed when switching from DL to UL and vice versa according to an implementation form.

FIG. 7 shows a frequency-time diagram 700 illustrating two nodes of a TDD system with minimum guard period (GP) needed when switching from DL to UL and vice versa according to an implementation form. Node A may be a transceiver device 1500 described below with respect to FIG. 15 that may transmit and/or receive. Node B may also be a transceiver device 1500 described below with respect to FIG. 15 that may transmit and/or receive. In the example of FIG. 7, in a first time interval Node A transmits 701 and Node B receives 704. When Node A has finished transmission 701 a first guard period 702 is included while Node B includes a second guard period 703 after reception 704 is finished. In a second time interval Node B transmits 701 while Node A receives 704. When Node B has finished transmission 701 the first guard period 702 is included while Node A includes the second guard period 703 after reception 704 is finished, etc.

In classical TDD system a Guard Period (GP) is required between DL and UL transmissions to allow for propagation delay and switching time of the power amplifier. Since the disclosed frame structure is partially TDD, the GP needs to be carefully designed to allow for propagation delay, while minimizing the GP overhead as much as possible.

FIG. 7 shows a typical TDD system and the minimal required GP at both communicating nodes (Node A and Node B). As shown, a node switching from transmission 701 to reception 704 needs to wait minimally for $2T_{prop}+T_{sw}$, while the node switching from reception to transmission is only $T_{sw}$. Taking these limitations the minimal GP applied to the disclosed frame structure for variant A is shown in FIG. 7. The minimal GP 702 for switching from transmission 701 to reception 704 is GP=2Tprop+Tswitch. The minimal GP 703 for switching from reception 704 to transmission 701 is GP=Tswitch. Hence, the GP can be minimized to the minimum physical needed time.

Figures 8A, 8B:
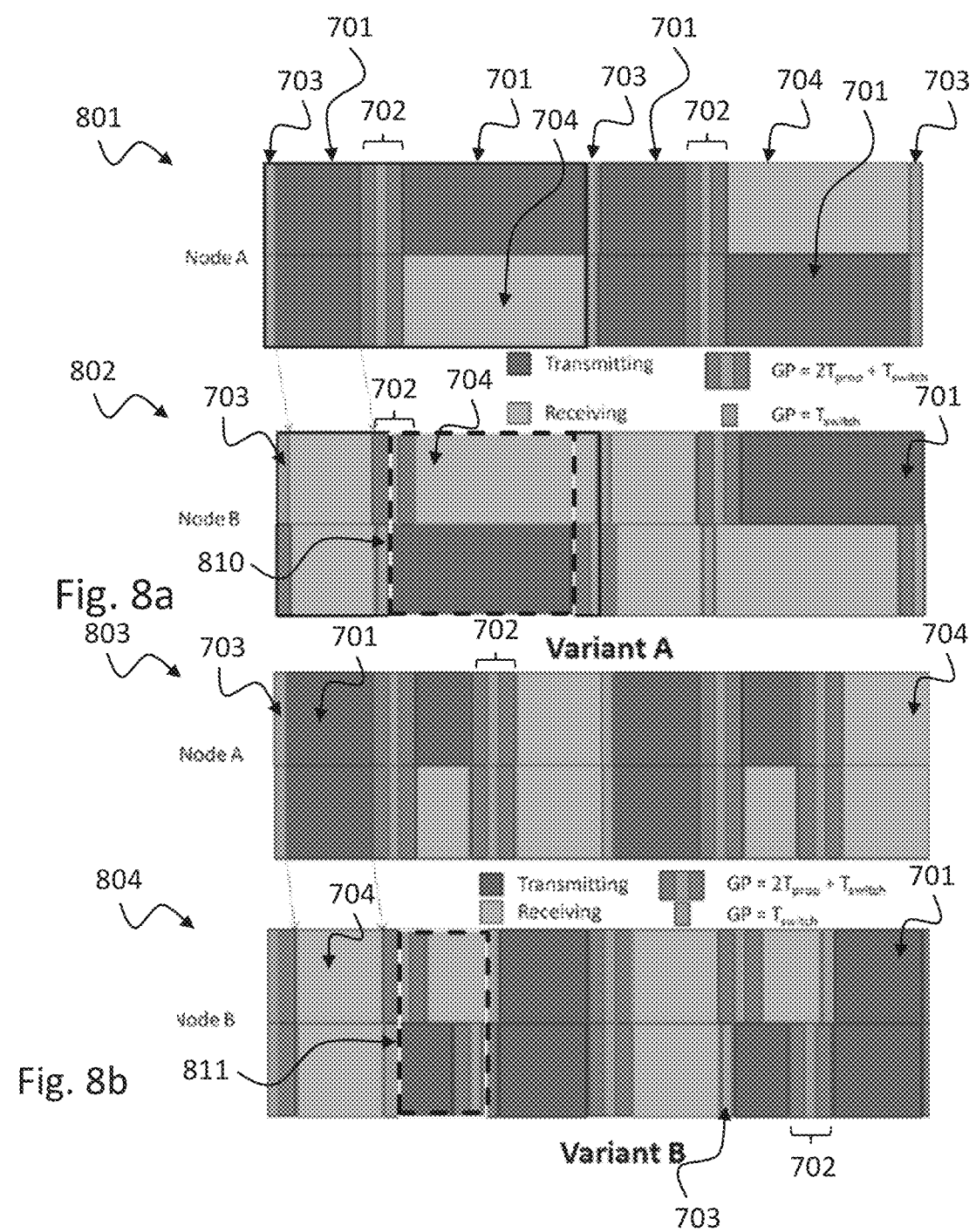
FIG. 8a & FIG. 8b shows frequency-time diagrams 801, 802, 803, 804 of two nodes for the variant A frame structure (FIG. 8a) and the variant B frame structure (FIG. 8b) to illustrate GP insertion technique to maintain synchronism at node A and subframe alignment according to an implementation form.

FIGS. 8a), b) show frequency-time diagrams 801, 802, 803, 804 of two nodes for the variant A frame structure (FIG. 8a) and the variant B frame structure (FIG. 8b) to illustrate GP insertion technique to maintain synchronism at node A and subframe alignment according to an implementation form. Node A may be a transceiver device 1500 described below with respect to FIG. 15 that may transmit and/or receive. Node B may also be a transceiver device 1500 described below with respect to FIG. 15 that may transmit and/or receive. Transmission intervals 701, reception intervals 704 as well as first guard period 702 and second guard period 703 may correspond to the respective sections described above with respect to FIG. 7.

FIG. 8a shows Variant A, where Tx/Rx signals are perfectly synchronized at Node A, but out of sync at Node B. By flipping the UL and DL locations each TTI, channel knowledge at both nodes can be obtained. FIG. 8b shows Variant B where Tx/Rx signals are perfectly synced at Node A, but out of sync at Node B.

Physically, it is not possible to maintain orthogonality of UL and DL in time due to the propagation delay. Hence, an approach is to maintain orthogonality at one of the nodes (in FIG. 8 shown above at Node A) and sacrifice orthogonality at the other node. Maintaining orthogonality at one of the nodes, implies adding a redundant GP at the transmission of node A. This redundant GP is also essential for maintaining frame-wise alignment of DL and UL transmissions.

As described above, one communicating node may suffer from asynchronous DL and UL transmission. This asynchronism is shown in the dashed rectangle 810 of node B for Variant A (FIG. 8a) in the dashed rectangle 811 of node B for Variant B (FIG. 8b). In the following sections receiver side operations are described in order to compensate for the asynchronism due to the propagation delay. By analyzing the components of the time interval in the dashed rectangles 810, 811 in FIGS. 8a and 8b, it can be seen that the signals can be represented as shown in FIGS. 9 and 10 below.

Figure 9:
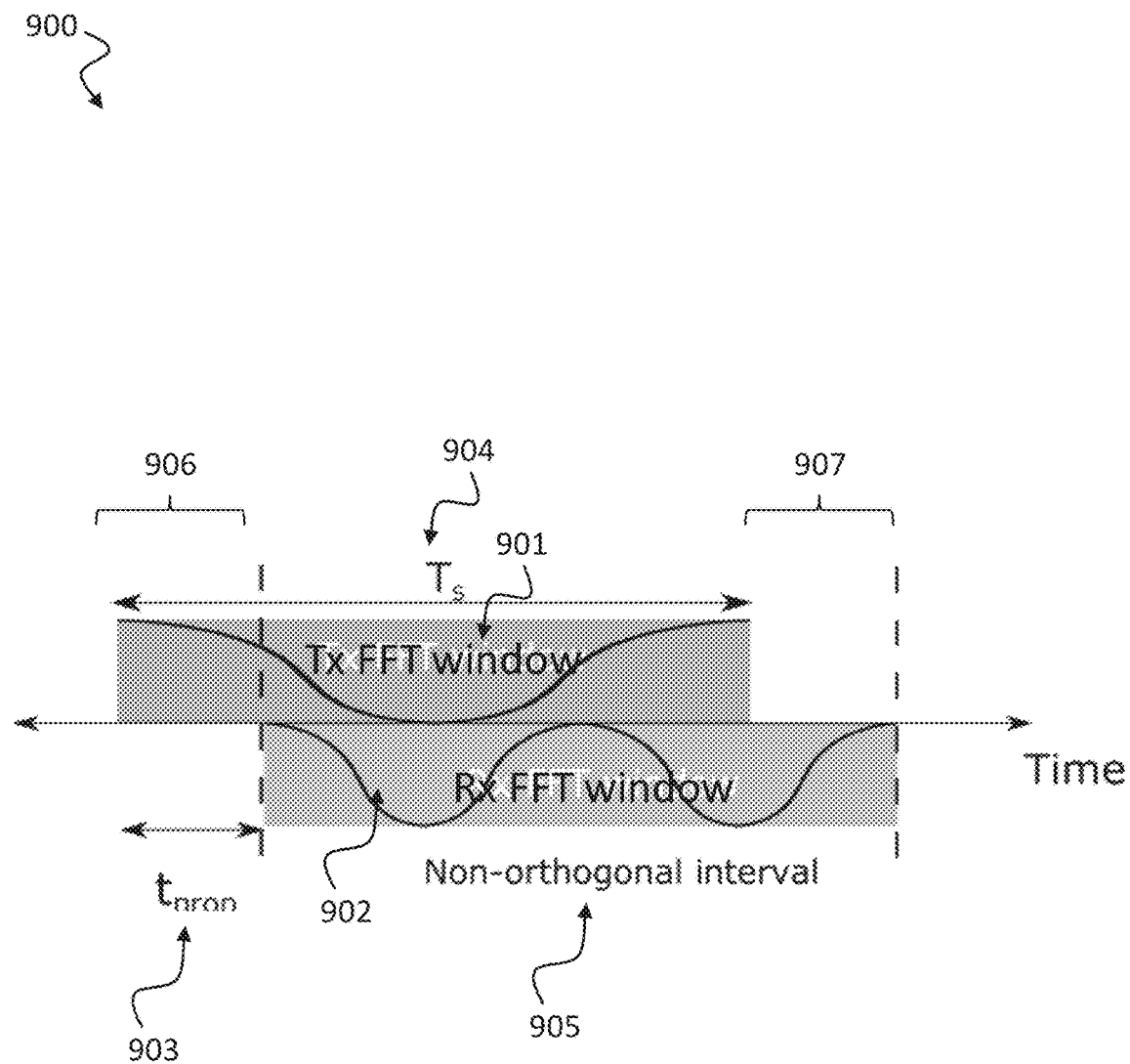
FIG. 9 shows a time diagram 900 illustrating asynchronism at node B due to propagation delay for TX and RX FFT windows according to an implementation form.
Figure 10:
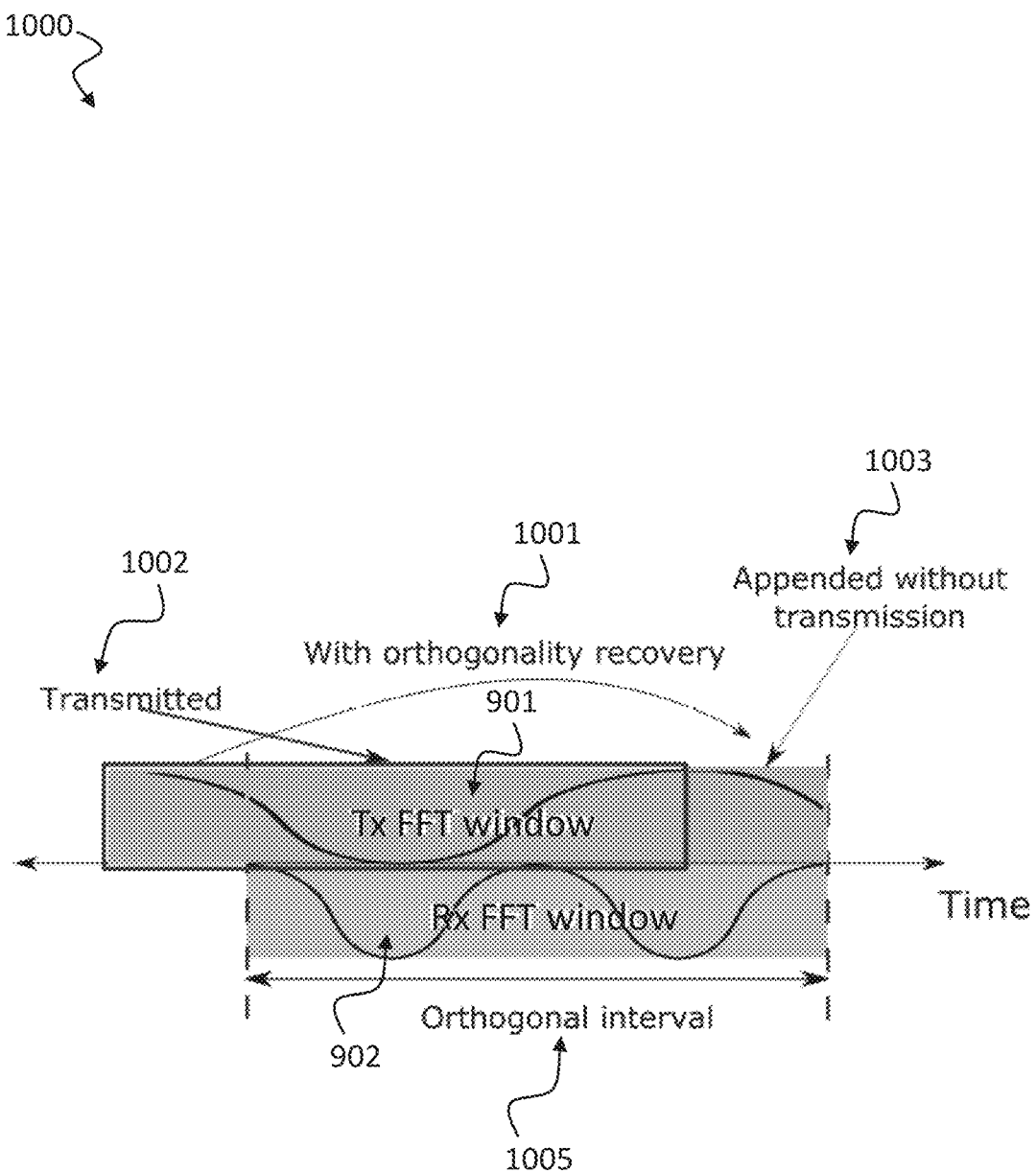
FIG. 10 shows a time diagram 1000 illustrating time domain compensation by appending portion of transmit signal without transmitting it for TX and RX FFT windows according to an implementation form.

FIG. 9 shows a time diagram 900 illustrating asynchronism at node B due to propagation delay 903 for TX and RX FFT windows 901, 902 according to an implementation form. Node A may be a transceiver device 1500 described below with respect to FIG. 15 that may transmit and/or receive. Node B may also be a transceiver device 1500 described below with respect to FIG. 15 that may transmit and/or receive.

As shown in FIG. 9, the transmit signal 901 (with Tx FFT window) is sent before the receive signal 902 (with Rx FFT window) arrives (so that it arrives in time at node A). Both signals are surrounded with guard periods where no transmissions occur.

When the FFT kernel is applied to the received signal 902, the transmit and receive signals 901, 902 do not fully overlap in time, causing non-orthogonality 905 among the subcarriers in the frequency domain.

The non-overlapping portion 906, 907 of transmit and receive signals 901, 902 have a duration 903 of $t_{prop}$, i.e. the propagation delay. To compensate for the non-overlapping portion 906, 907 of the signals two approaches are presented below. A first approach is a time domain solution, e.g. as presented below with respect to FIG. 13 and second approach is a frequency domain solution, e.g. as presented below with respect to FIG. 14.

FIG. 10 shows a time diagram 1000 illustrating time domain compensation by appending portion of transmit signal without transmitting it for TX and RX FFT windows 901, 902 according to an implementation form.

In the time domain compensation approach the receiver selects a portion of the transmit signal 901 (portion 906 in FIG. 9) and appends 1003 it at the non-overlapping region (portion 907 in FIG. 9) of the received signal 902 as shown in FIG. 10. The appended portion 907 is not transmitted since at this time a GP is needed to maintain subframe alignment. Thus, only transmit signal (windowed by Tx FFT window) is transmitted 1002 while portion 907 is appended 1003 without transmission for orthogonality recovery 1001.

Figure 11:
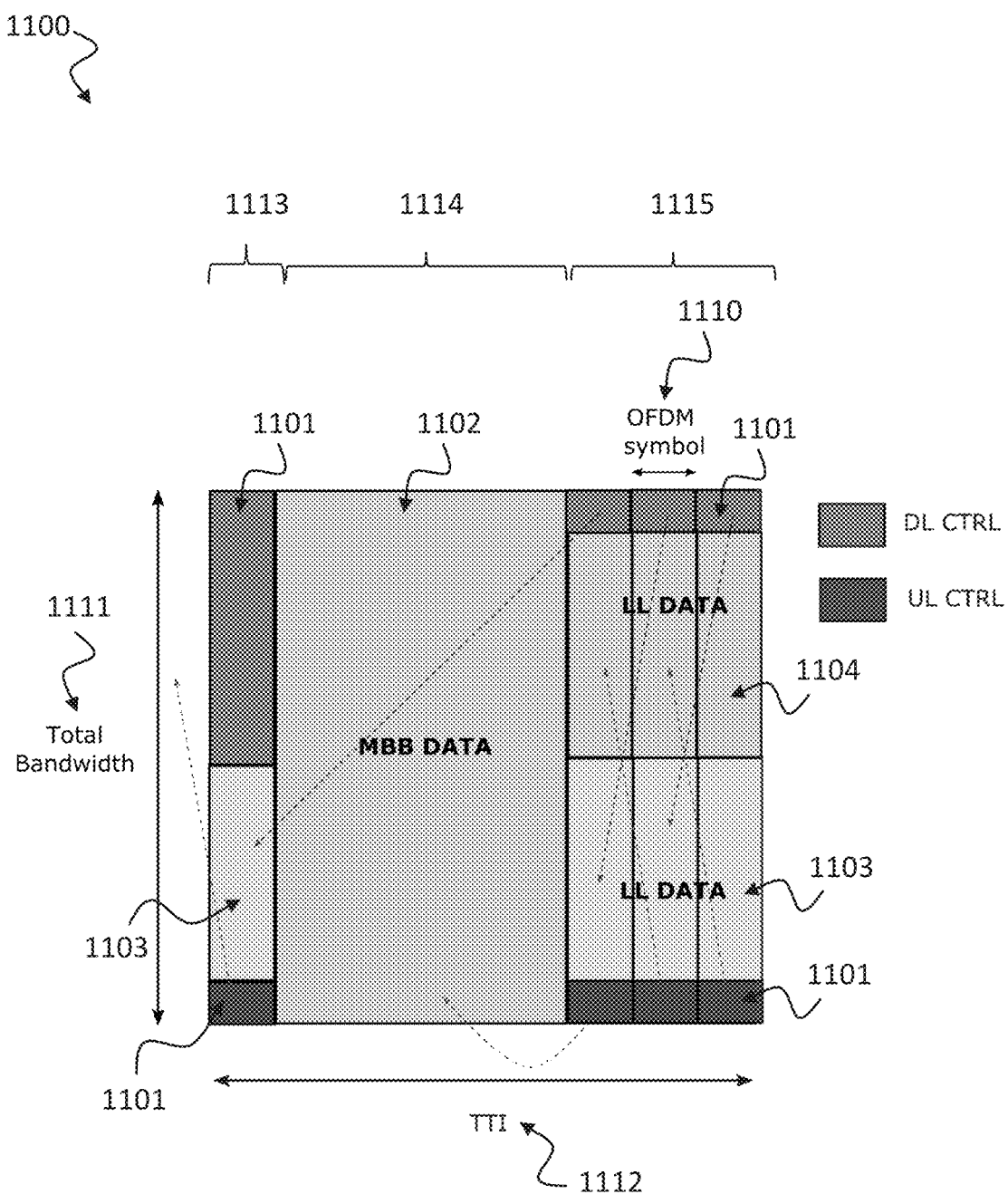
FIG. 11 shows a frequency-time diagram illustrating ACK correspondence for a variant A frame type 1100 according to an implementation form.

FIG. 11 shows a frequency-time diagram illustrating ACK correspondence for a variant A frame type 1100 according to an implementation form. This frequency-time diagram may correspond to the frame type variant A 100b described above with respect to FIG. 1.

The frame structure 1100 includes a first (time) section 1113 in which a first FDD scheme is applied, a second (time) section 1114 in which a second FDD scheme is applied and a third (time) section 1115 in which a third FDD scheme is applied. In this exemplary frame structure 1100, the first FDD scheme assigns DL control data 1101 to first frequency resources, LL UL data 1103 to second frequency resources and UL control data 1101 to third frequency resources of the first section 1113; the second FDD scheme assigns MBB DL data 1102 to the whole frequency resources of the second section 1113; and the third FDD scheme assigns DL control data 1101 to first frequency resources, LL DL data 1104 to second frequency resources, LL UL data 1103 to third frequency resources and UL control data 1101 to fourth frequency resources of the third section 1115.

The possible embodiment of variant A shown in FIG. 11 is suitable for base station broadcasting a media service such as video (MBB) and at the same exchanging latency sensitive traffic of other vehicles in its cell. The location of the ACK of the data section and its correspondence is highlighted using the dashed arrows shown in FIG. 11

An Acknowledgement (ACK) included in a first OFDM symbol 1110 of DL control data 1101 of the third section 1115 may correspond to LL UL data 1103 of the first section 1113. An Acknowledgement (ACK) included in a second OFDM symbol 1110 of DL control data 1101 of the third section 1115 may correspond to LL UL data 1103 included in the first OFDM symbol 1110 of the third section 1115. An Acknowledgement (ACK) included in a third OFDM symbol 1110 of DL control data 1101 of the third section 1115 may correspond to LL UL data 1103 included in the second OFDM symbol 1110 of the third section 1115. An Acknowledgement (ACK) included in a second OFDM symbol 1110 of DL control data 1101 of the third section 1115 may correspond to LL DL data 1104 included in the first OFDM symbol 1110 of the third section 1115. An Acknowledgement (ACK) included in a third OFDM symbol 1110 of DL control data 1101 of the third section 1115 may correspond to LL DL data 1104 included in the second OFDM symbol 1110 of the third section 1115 as shown in FIG. 11.

The frame structure 1100 shown in FIG. 11 is suitable to multiplex MBB traffic and low latency traffic in a single frame. It is suitable for a base station transmitting to users running several services with different latency requirements. For example, for a base station that broadcasts a media service such as video (MBB) and at the same sharing latency sensitive traffic of other vehicles in its neighborhood.

Figure 12:
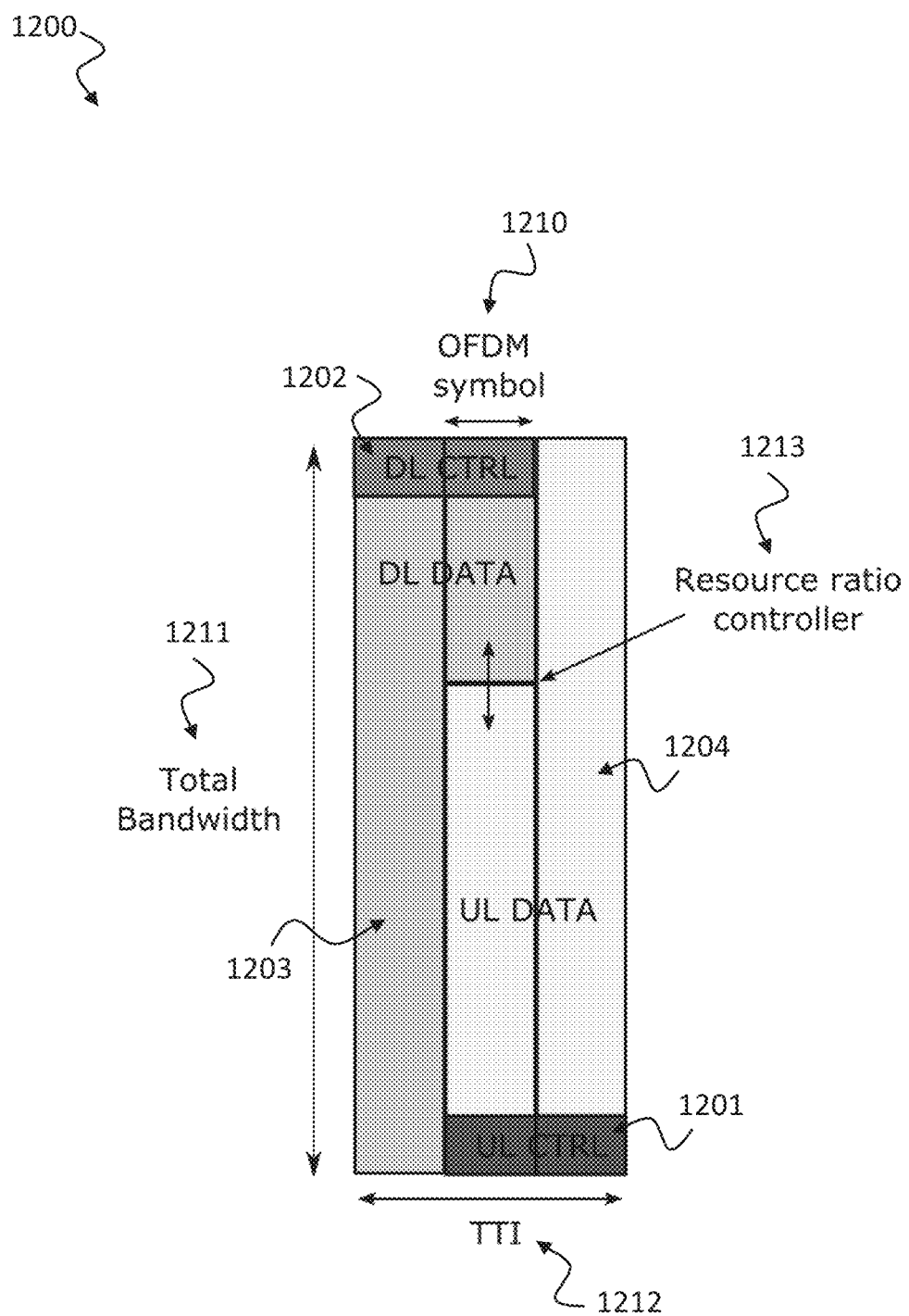
FIG. 12 shows a frequency-time diagram illustrating location of control channels for a variant B frame type 1200 according to an implementation form.

FIG. 12 shows a frequency-time diagram illustrating location of control channels for a variant B frame type 1200 according to an implementation form.

The frame structure 1200 includes a first part of frequency resources including DL control traffic 1202 and DL data traffic 1203, a second part of frequency resources including DL control traffic 1202, DL data traffic 1203, UL data traffic 1204 and UL control traffic 1201 and a third part of frequency resources including UL data traffic 1204 and UL control traffic 1201. Each part has a time duration of one OFDM symbol 1210. Separation of DL data 1203 and UL data 1204 in the second part is adjustable by a resource ratio controller 1213 for adjusting the frequency switching point.

In FIG. 12 the data and control channel are multiplexed in an FDM manner. This enables fast ACK feedback for low latency applications.

DL:UL ratio can be modified by resource ratio controller 1213. Control channel 1201, 1202 may be at the edge of the bandwidth (as in LTE UL). This frame structure 1200 is suitable for low latency bidirectional traffic, for example for V2V driving trajectory exchange or factory automation.

Figure 13:
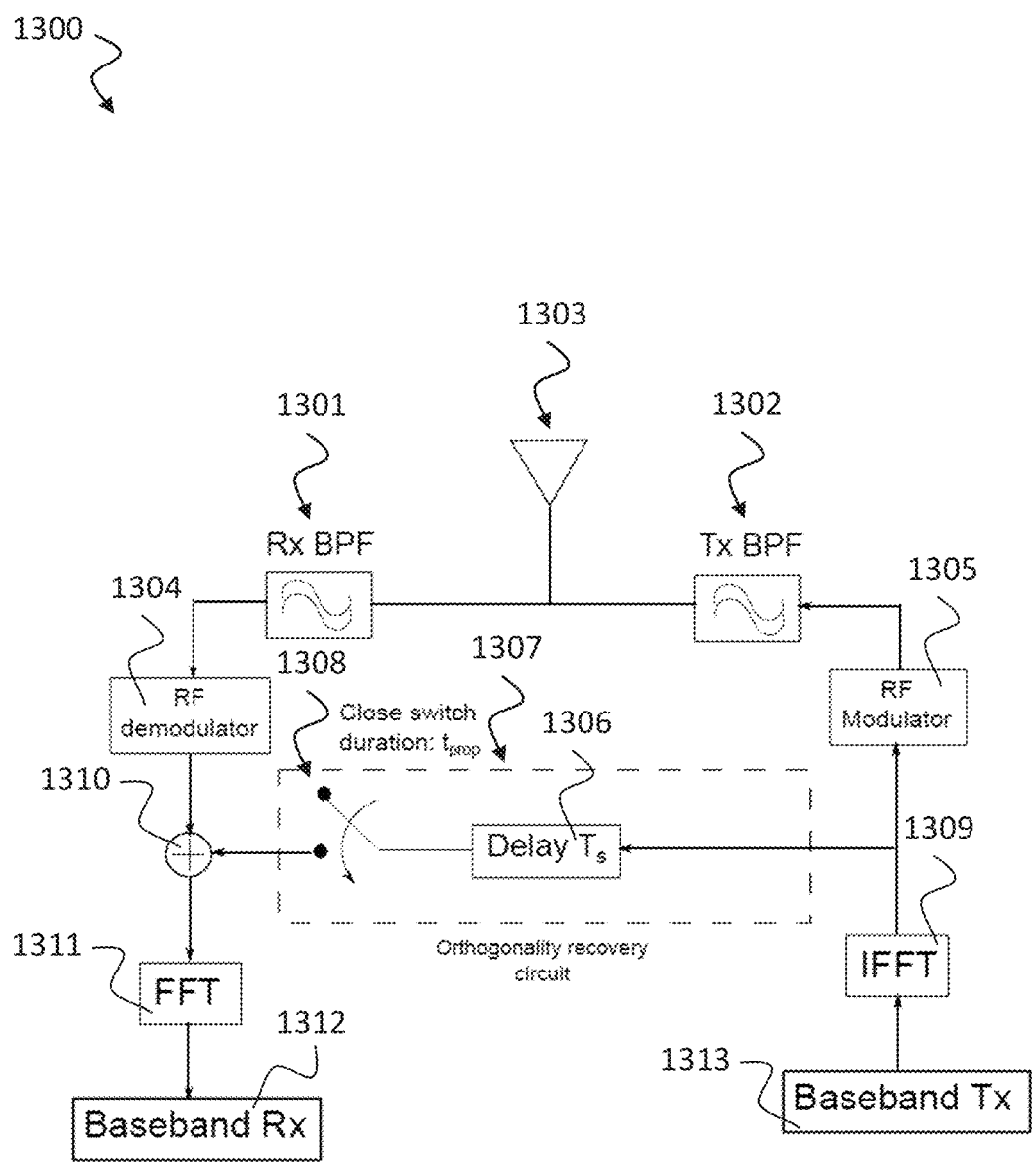
FIG. 13 shows a simplified block diagram illustrating a time-domain compensation transceiver device 1300 according to an implementation form.

FIG. 13 shows a block diagram illustrating a time-domain compensation transceiver device 1300 according to an implementation form. FIG. 13 illustrates a possible circuit which performs the appending task described above with respect to FIGS. 9 and 10 in the time domain.

The transceiver device 1300 includes a transmit path and a receive path coupled by an antenna 1303 and in parallel by an orthogonality recovery circuit 1307. The transmit path includes a baseband Tx 1313, an IFFT module 1309 an RF modulator 1305 and a Tx BPF 1302 for processing a transmit signal to be passed to antenna 1303. The receive path includes a RX BPF 1301, an RF demodulator 1304, an FFT module 1311 and a baseband Rx 1312 for processing a receive signal received from antenna 1303. The orthogonality recovery circuit 1307 is coupled behind transmitter IFFT module 1309 and before receiver FFT module 1311 (using an adder 1310) and includes a delay 1306 of time Ts. The orthogonality recovery circuit 1307 is switched by switch 1308 into the parallel path between transmitter and receiver in order to perform time-domain compensation as described above with respect to FIGS. 9 and 10.

Figure 14:
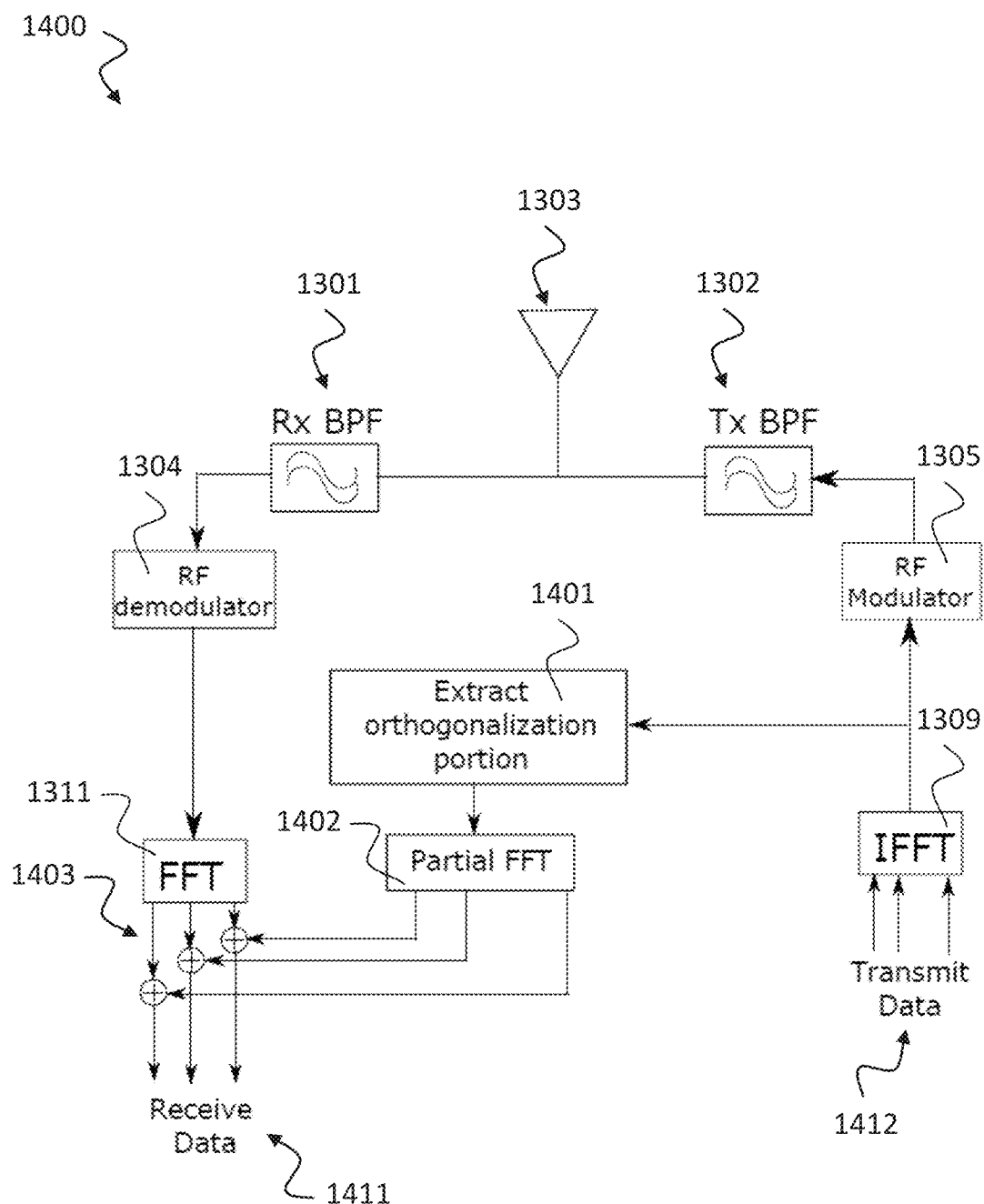
FIG. 14 shows a simplified block diagram illustrating a frequency-domain compensation transceiver device 1400 according to an implementation form.

FIG. 14 shows a block diagram illustrating a frequency-domain compensation transceiver device 1400 according to an implementation form.

The second approach for compensating the non-overlapping portion as described above with respect to FIGS. 9 and 10 is done in the frequency domain. In this approach, an FFT is computed for the part to be appended. The resultant FFT 1402 is added to the received signal's FFT 1311 in order to mimic the effect of appending the portion in time domain.

For the receiver to append a portion to the received signal, it needs to know the propagation time causing the non-overlapping portion. The propagation delay can be obtained from the geographical locations of the communicating nodes. In V2V applications, the geographical locations are anyway exchanged periodically (for example Cooperative Awareness Message (CAM)).

The transceiver device 1400 includes a transmit path and a receive path coupled by an antenna 1303 and in parallel by an orthogonalization recovery module 1401. The transmit path includes a baseband Tx 1313 providing transmit data 1412, an IFFT module 1309, an RF modulator 1305 and a Tx BPF 1302 for processing the transmit data 1412 to be passed to antenna 1303. The receive path includes a RX BPF 1301, an RF demodulator 1304 and an FFT module 1311 for providing receive data 1411 from a receive signal received from antenna 1303. The orthogonalization recovery module 1401 is coupled behind transmitter IFFT module 1309 and before receiver FFT module 1311 (using an adder 1403 in frequency domain) and includes a partial FFT 1402. The orthogonalization module 1401 performs frequency-domain compensation as described above with respect to FIGS. 9 and 10.

Figure 15:
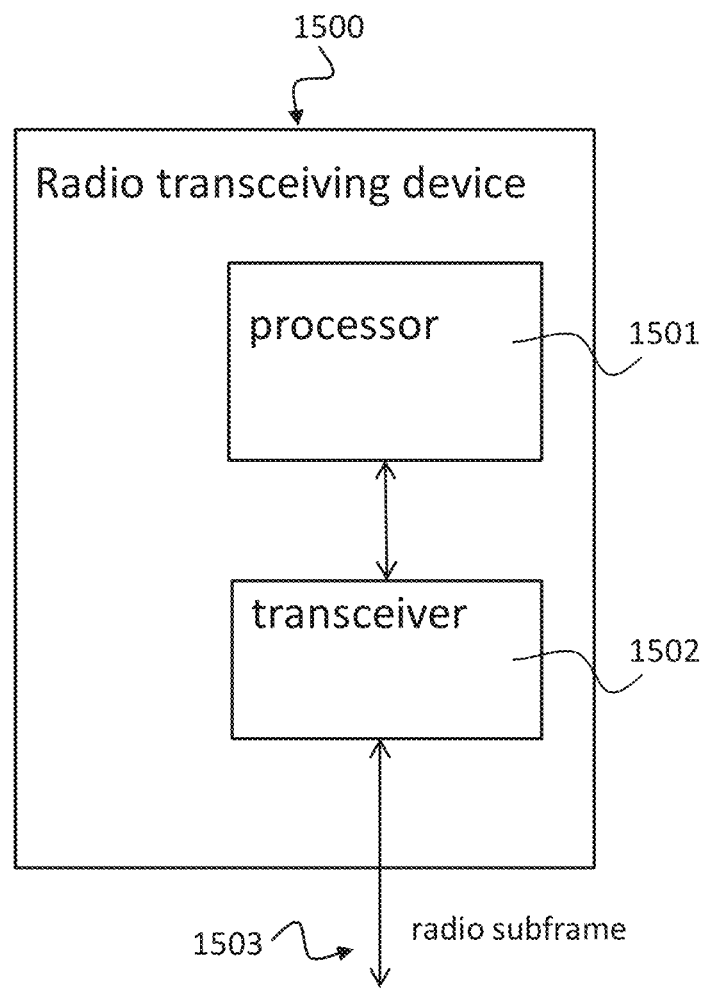
FIG. 15 shows a simplified block diagram illustrating the general structure of a transceiver device 1500 according to an implementation form.

FIG. 15 shows a block diagram illustrating the general structure of a transceiver device 1500 according to an implementation form. The radio transceiver device 1500 includes a processor 1501 and a transceiver 1502.

The processor 1501 is configured to process a radio subframe 1503 comprising a plurality of resource elements in time and frequency, e.g. a subframe 100b according to Variant A or a subframe 100d according to Variant B as described above with respect to FIG. 1. A first portion 111, 113 as depicted in FIG. 1 of the resource elements comprises resource elements which are based on a first division duplexing scheme. A second portion 112, 114 as depicted in FIG. 1 of the resource elements comprises resource elements which are based on a second division duplexing scheme. The transceiver 1502 is configured to transceive the radio subframe 1503 within a transmission time interval (TTI).

The first division duplexing scheme may be a first time division duplexing (TDD) scheme, e.g. as described above with respect to FIG. 1 for Variant B (frame structure 100d). The second division duplexing scheme ma be a second TDD scheme having a different time switching point 122 than the first TDD scheme, e.g. as described above with respect to FIG. 1 for Variant B (frame structure 100d).

A difference between the time switching point 121 of the first TDD scheme and the time switching point 122 of the second TDD scheme may correspond a time duration of one symbol, e.g. as described above with respect to FIGS. 1 and 2. Resource elements of the radio subframe 1503, 100d ranging from the time switching point 121 of the first TDD scheme to the time switching point 122 of the second TDD scheme may include a first frequency section carrying UL symbols 102 and a second frequency section carrying DL symbols 101, e.g. as described above with respect to FIGS. 1 and 2. A frequency switching point 124 between the first frequency section and the second frequency section may be variable, e.g. as described above with respect to FIGS. 1 and 2. The UL symbols 102 of the first frequency section and the DL symbols 101 of the second frequency section may have a guard period of zero or more subcarriers in between, e.g. as described above with respect to FIGS. 1 and 2.

The UL symbols 102, 204 of the first frequency section and the DL symbols 101, 203 of the second frequency section may be precoded, e.g. as described above with respect to FIG. 2. The processor 1501 may determine the frequency switching point 124 between the first frequency section and the second frequency section and/or the time switching points 121, 122 of the first TDD scheme and the second TDD scheme according to an optimization criterion, in particular a desired DL versus UL data rate ratio, e.g. as described above with respect to FIGS. 1 and 2.

The radio subframe 1503 may include a section of UL symbols 102 and a section of DL symbols 101 which are separated by a guard period 702, 703, e.g. as described above with respect to FIG. 7. The guard period 703 may correspond to a difference between the time switching point 121 of the first TDD scheme and the time switching point 122 of the second TDD scheme when the radio transceiver device switches from reception 704 to transmission 701, e.g. as described above with respect to FIG. 7. The guard period 702 may correspond to the difference $T_{switch}$ between the time switching point 121 of the first TDD scheme and the time switching point 122 of the second TDD scheme which difference is increased by twice a propagation time $T_{prop}$ when the radio transceiver device switches from transmission 701 to reception 704, e.g. as described above with respect to FIG. 7. The processor 1501 may add a redundant guard period 702, 703 at transmission 701 and/or reception 704 to maintain subframe alignment, e.g. as described above with respect to FIG. 7.

The processor 1501 is configured to process a next radio subframe 611, e.g. as described above with respect to FIG. 6, wherein a location of UL subcarriers 602, 605 and DL subcarriers 601, 604 alternate from the radio subframe 610 to the next radio subframe 611.

The transceiver 1502 may include a transmitter to transmit a transmit signal based on the radio subframe within a transmission time interval 901, e.g. as described above with respect to FIG. 9. The transceiver 1502 may include a receiver configured to receive a receive signal within a reception time interval 902 that is delayed with respect to the transmission time interval 901, in particular delayed by a propagation time 903, e.g. as described above with respect to FIG. 9. The processor 1501 may be configured to append 1003 a first portion 906 of the transmit signal that is located outside of the reception time interval 902 as a second portion 907 of the transmit signal that is located inside the reception time interval 902 in order to align the transmission time interval 901 with the reception time interval 902, e.g. as described above with respect to FIG. 9.

The transmitter may transmit the transmit signal without the appended 1003 second portion 907 of the transmit signal, e.g. as described above with respect to FIGS. 9 and 10. The processor 1501 may be configured to compensate the first portion 906 of the transmit signal in time-domain 1300 or in frequency domain 1400, e.g. as described above with respect to FIGS. 13 and 14.

The first division duplexing scheme may be a first frequency division duplexing (FDD) scheme and the second division duplexing scheme may be a second FDD scheme having a different frequency switching point 123 than the first FDD scheme, e.g. as described above with respect to FIG. 1.

Figure 16:
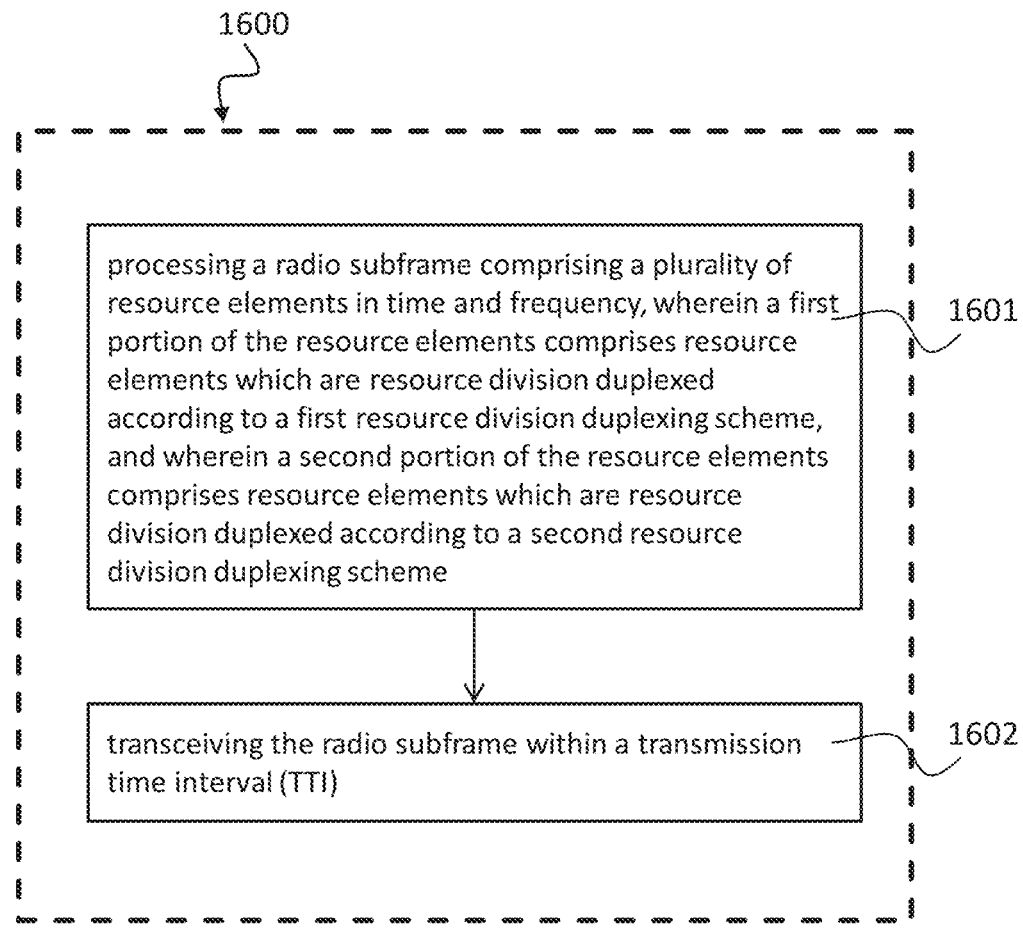
FIG. 16 shows a flow diagram of a method 1600 for transceiving a radio subframe according to an implementation form.

FIG. 16 shows a schematic diagram of a method 1600 for transceiving a radio subframe according to an implementation form. The method 1600 may implement the corresponding functionality of the radio transceiver device 1500 as described above with respect to FIG. 15.

The method 1600 includes processing 1601 a radio subframe comprising a plurality of resource elements in time and frequency, wherein a first portion of the resource elements comprises resource elements which are based on a first division duplexing scheme, and wherein a second portion of the resource elements comprises resource elements which are based on a second division duplexing scheme. The method 1600 further includes transceiving 1602 the radio subframe within a transmission time interval (TTI).

The present disclosure also supports a computer program product including computer executable code or computer executable instructions that, when executed, causes at least one computer to execute the performing and computing steps described herein, in particular the steps of the methods described above. Such a computer program product may include a readable non-transitory storage medium storing program code thereon for use by a computer. The program code may perform the processing and computing steps described herein, in particular the method 1600 described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:
1. A radio transceiver device, comprising:
a processor, configured to process a radio subframe comprising a plurality of resource elements in time and frequency, wherein a first portion of the plurality of resource elements comprises resource elements that are based on a first division duplexing scheme, and wherein a second portion of the plurality of resource elements comprises resource elements that are based on a second division duplexing scheme, wherein the first division duplexing scheme is a first time division duplexing (TDD) scheme and the second division duplexing scheme is a second TDD scheme having a different time switching point than the first TDD scheme and the radio subframe further comprises a section of UL symbols and a section of DL symbols that are separated by a guard period; and
a transceiver configured to transceiver the radio subframe within a transmission time interval,
wherein the guard period corresponds to a difference between the time switching point of the first TDD scheme and the time switching point of the second TDD scheme when the radio transceiver device switches from reception to transmission; and
wherein the guard period corresponds to the difference ($T_{switch}$) between the time switching point of the first TDD scheme and the time switching point of the second TDD scheme, which difference is increased by twice a propagation time ($T_{prop}$) when the radio transceiver device switches from transmission to reception.
2. The radio transceiver device of claim 1, wherein a difference between the time switching point of the first TDD scheme and the time switching point of the second TDD scheme corresponds to a time duration of one symbol.

3. The radio transceiver device of claim 1, wherein resource elements of the plurality of resource elements of the radio subframe ranging from the time switching point of the first TDD scheme to the time switching point of the second TDD scheme comprise a first frequency section carrying UL symbols and a second frequency section carrying DL symbols.

4. The radio transceiver device of claim 3, wherein a frequency switching point between the first frequency section and the second frequency section is variable.

5. The radio transceiver device of claim 4, wherein the processor is further configured to:
determine at least one of the frequency switching point between the first frequency section and the second frequency section; or
determine the time switching points of the first TDD scheme and the second TDD scheme according to an optimization criterion, wherein the optimization criterion is a desired DL versus UL data rate ratio.

6. The radio transceiver device of claim 3, wherein the UL symbols of the first frequency section and the DL symbols of the second frequency section have a guard period of zero or more subcarriers in between.

7. The radio transceiver device of claim 3, wherein the UL symbols of the first frequency section and the DL symbols of the second frequency section are precoded.

8. The radio transceiver device of claim 1, wherein the processor is configured to add a redundant guard period to at least one of transmission or reception to maintain a subframe alignment.

9. The radio transceiver device of claim 1, wherein the processor is further configured to process a next radio subframe, wherein a location of UL subcarriers and DL subcarriers alternate from the radio subframe to the next radio subframe.

10. The radio transceiver device of claim 1, wherein the transceiver comprises a transmitter configured to transmit a transmit signal based on the radio subframe within a transmission time interval,
wherein the transceiver comprises a receiver configured to receive a receive signal within a reception time interval that is delayed by a propagation time with respect to the transmission time interval, and
wherein the processor is further configured to append a first portion of the transmit signal that is located outside of the reception time interval as a second portion of the transmit signal that is located inside the reception time interval in order to align the transmission time interval with the reception time interval.

11. The radio transceiver device of claim 10, wherein the transmitter is configured to transmit the transmit signal without the appended second portion of the transmit signal.

12. The radio transceiver device of claim 10, wherein the processor is configured to compensate the first portion of the transmit signal in a time-domain or in a frequency domain.

13. The radio transceiver device of claim 1, wherein the first division duplexing scheme is a first frequency division duplexing (FDD) scheme and the second division duplexing scheme is a second FDD scheme having a different frequency switching point than the first FDD scheme.

14. A method for transceiving a radio subframe, the method comprising:
processing a radio subframe comprising a plurality of resource elements in time and frequency, wherein a first portion of the plurality of resource elements comprises resource elements that are based on a first division duplexing scheme, and wherein a second portion of the plurality of resource elements comprises resource elements that are based on a second division duplexing scheme, wherein the first division duplexing scheme is a first time division duplexing (TDD) scheme and the second division duplexing scheme is a second TDD scheme having a different time switching point than the first TDD scheme and the radio subframe further comprises a section of UL symbols and a section of DL symbols that are separated by a guard period; and
transceiving the radio subframe within a transmission time interval,
wherein the guard period corresponds to a difference between the time switching point of the first TDD scheme and the time switching point of the second TDD scheme when the radio transceiver device switches from reception to transmission; and
wherein the guard period corresponds to the difference ($T_{switch}$) between the time switching point of the first TDD scheme and the time switching point of the second TDD scheme, which difference is increased by twice a propagation time ($T_{prop}$) when the radio transceiver device switches from transmission to reception.

15. The method of claim 14, wherein the first division duplexing scheme is a first time division duplexing (TDD) scheme and the second division duplexing scheme is a second TDD scheme having a different time switching point than the first TDD scheme.

16. The method of claim 15, wherein a difference between the time switching point of the first TDD scheme and the time switching point of the second TDD scheme corresponds to a time duration of one symbol.

17. A non transitory computer readable storage medium having stored thereon program instructions that when executed by a processor causes the processor to perform method steps comprising:
processing a radio subframe comprising a plurality of resource elements in time and frequency, wherein a first portion of the plurality of resource elements comprises resource elements that are based on a first division duplexing scheme, and wherein a second portion of the plurality of resource elements comprises resource elements that are based on a second division duplexing scheme, wherein the first division duplexing scheme is a first time division duplexing (TDD) scheme and the second division duplexing scheme is a second TDD scheme having a different time switching point than the first TDD scheme and the radio subframe further comprises a section of UL symbols and a section of DL symbols that are separated by a guard period; and
transceiving the radio subframe within a transmission time interval,
wherein the guard period corresponds to a difference between the time switching point of the first TDD scheme and the time switching point of the second TDD scheme when the radio transceiver device switches from reception to transmission; and wherein the guard period corresponds to the difference ($T_{switch}$) between the time switching point of the first TDD scheme and the time switching point of the second TDD scheme, which difference is increased by twice a propagation time ($T_{prop}$) when the radio transceiver device switches from transmission to reception.

* * * * *

UNITED STATES PATENT AND TRADEMARK OFFICE
CERTIFICATE OF CORRECTION

PATENT NO. : 10,880,069 B2  
APPLICATION NO. : 16/434912  
DATED : December 29, 2020  
INVENTOR(S) : Ibrahim et al.

It is certified that error appears in the above-identified patent and that said Letters Patent is hereby corrected as shown below:

In the Claims

Claim 1: Column 18, Line 54: "a transceiver configured to transceiver the radio subframe" should read -- a transceiver configured to transceive the radio subframe --.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*